United States Patent
Ohno et al.

(10) Patent No.: US 7,457,899 B2
(45) Date of Patent: Nov. 25, 2008

(54) METHOD FOR CONTROLLING STORAGE SYSTEM, AND STORAGE CONTROL APPARATUS

(75) Inventors: Hiroshi Ohno, Kanagawa (JP); Kouji Arai, Kanagawa (JP); Toshio Nakano, Kanagawa (JP); Hideo Tabuchi, Kanagawa (JP); Akinobu Shimada, Kanagawa (JP); Ai Satoyama, Kanagawa (JP); Yasutomo Yamamoto, Kanagawa (JP); Yoshiaki Eguchi, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 24 days.

(21) Appl. No.: 11/338,796

(22) Filed: Jan. 25, 2006

(65) Prior Publication Data

US 2006/0168369 A1 Jul. 27, 2006

Related U.S. Application Data

(63) Continuation of application No. 10/424,563, filed on Apr. 25, 2003, now Pat. No. 7,051,121.

(30) Foreign Application Priority Data

Apr. 26, 2002 (JP) ............................. 2002-127058
Nov. 18, 2002 (JP) ............................. 2002-333540

(51) Int. Cl.
*G06F 13/12* (2006.01)
(52) U.S. Cl. ................................ 710/74; 710/5; 709/225
(58) Field of Classification Search ........................ None
See application file for complete search history.

(56) References Cited

U.S. PATENT DOCUMENTS

| | | | |
|---|---|---|---|
| 3,771,137 A | 11/1973 | Barner et al. | |
| 4,025,904 A | 5/1977 | Adney et al. | |
| 5,155,845 A * | 10/1992 | Beal et al. | 714/6 |
| 5,193,184 A * | 3/1993 | Belsan et al. | 711/4 |
| 5,408,465 A | 4/1995 | Gusella et al. | |

(Continued)

FOREIGN PATENT DOCUMENTS

| | | |
|---|---|---|
| EP | 0981091 | 2/0000 |
| EP | 1130514 | 9/2001 |
| EP | 1158386 | 11/2001 |
| JP | 09-288547 | 4/1997 |
| JP | 10-283272 | 10/1998 |

(Continued)

OTHER PUBLICATIONS

SICOLA "SCSI-3 Fault Tolerant Controller Configurations", T10 Technical Committee of the International Committee on Information Technology Standards, Feb. 28, 1996, available at http://ww.t10.org(1996).

(Continued)

*Primary Examiner*—Eron J Sorrell
(74) *Attorney, Agent, or Firm*—Mattingly, Stanger, Malur & Brundidge, PC

(57) ABSTRACT

A method for controlling a storage system including a host computer, and a first and a second storage control apparatuses each receiving a data input/output request from the host computer and executing a data input/output process for a storage device in response to the request, comprises connecting a first communication path between the host computer and the first apparatus; connecting a second communication path between the first apparatus and the second apparatus; receiving by the first apparatus a first data input/output request from the host computer through the first path; when the first apparatus has judged that the first request is not for the first apparatus, transmitting by the first apparatus a second data input/output request corresponding to the first request, to the second apparatus through the second path; and by the second apparatus, receiving the second request and executing a data input/output process corresponding to the second request received.

20 Claims, 19 Drawing Sheets

U.S. PATENT DOCUMENTS

| | | | |
|---|---|---|---|
| 5,459,857 A | 10/1995 | Ludlam et al. | |
| 5,504,882 A | 4/1996 | Chai et al. | |
| 5,548,712 A | 8/1996 | Larson et al. | |
| 5,680,580 A | 10/1997 | Beardsley et al. | |
| 5,680,640 A | 10/1997 | Ofek et al. | |
| 5,758,118 A | 5/1998 | Choy et al. | |
| 5,835,954 A | 11/1998 | Duyanovich et al. | |
| 5,870,537 A | 2/1999 | Kern et al. | |
| 5,895,485 A | 4/1999 | Loechel et al. | |
| 5,917,723 A | 6/1999 | Binford | |
| 5,956,750 A | 9/1999 | Yamamoto et al. | |
| 5,978,890 A | 11/1999 | Ozawa et al. | |
| 6,012,123 A | 1/2000 | Pecone et al. | |
| 6,098,129 A | 8/2000 | Fukuzawa et al. | |
| 6,108,748 A | 8/2000 | Ofek et al. | |
| 6,173,374 B1 | 1/2001 | Heil et al. | |
| 6,195,730 B1 | 2/2001 | West | |
| 6,219,753 B1 | 4/2001 | Richardson | |
| 6,230,239 B1 | 5/2001 | Sakaki et al. | |
| 6,240,486 B1 | 5/2001 | Ofek et al. | |
| 6,240,494 B1 | 5/2001 | Nagasawa et al. | |
| 6,247,099 B1 | 6/2001 | Skazinski et al. | |
| 6,247,103 B1 | 6/2001 | Kern et al. | |
| 6,356,977 B2 | 3/2002 | Ofek et al. | |
| 6,374,327 B2 | 4/2002 | Sakaki et al. | |
| 6,393,537 B1 | 5/2002 | Kern et al. | |
| 6,446,141 B1 | 9/2002 | Nolan et al. | |
| 6,446,175 B1 | 9/2002 | West et al. | |
| 6,457,139 B1 | 9/2002 | D'Errico et al. | |
| 6,484,173 B1 | 11/2002 | O'Hare et al. | |
| 6,490,659 B1 | 12/2002 | McKean et al. | |
| 6,523,096 B2 | 2/2003 | Sanada et al. | |
| 6,529,976 B1 | 3/2003 | Fukuzawa et al. | |
| 6,542,961 B1 | 4/2003 | Matsunami et al. | |
| 6,553,408 B1 | 4/2003 | Merrell et al. | |
| 6,598,134 B2 | 7/2003 | Ofek et al. | |
| 6,640,278 B1 | 10/2003 | Nolan et al. | |
| 6,640,291 B2 | 10/2003 | Fujibayashi | |
| 6,647,474 B2 | 11/2003 | Yanai et al. | |
| 6,647,476 B2 | 11/2003 | Nagasawa et al. | |
| 6,654,830 B1 | 11/2003 | Taylor et al. | |
| 6,654,831 B1 | 11/2003 | Otterness et al. | |
| 6,675,258 B1 | 1/2004 | Bramhall et al. | |
| 6,681,303 B1 | 1/2004 | Watanabe et al. | |
| 6,681,339 B2 | 1/2004 | McKean et al. | |
| 6,684,310 B2 | 1/2004 | Anzai et al. | |
| 6,708,232 B2 | 3/2004 | Obara | |
| 6,745,281 B1 | 6/2004 | Saegusa | |
| 6,799,255 B1 | 9/2004 | Blumenau | |
| 6,816,948 B2 | 11/2004 | Kitamura et al. | |
| 6,826,666 B2 * | 11/2004 | Berkowitz et al. | 711/162 |
| 6,826,778 B2 | 11/2004 | Bopardikar et al. | |
| 6,836,830 B1 | 12/2004 | Yamagami et al. | |
| 6,851,020 B2 | 2/2005 | Matsumoto et al. | |
| 6,880,062 B1 | 4/2005 | Ibrahim et al. | |
| 6,883,064 B2 | 4/2005 | Yoshida et al. | |
| 6,976,134 B1 | 12/2005 | Lolayekar et al. | |
| 6,981,115 B2 | 12/2005 | Yamagami et al. | |
| 7,082,462 B1 | 7/2006 | Matsunami et al. | |
| 7,203,730 B1 | 4/2007 | Meyer et al. | |
| 2001/0050915 A1 | 12/2001 | O'Hare et al. | |
| 2001/0052018 A1 | 12/2001 | Yokokura | |
| 2002/0004857 A1 | 1/2002 | Arakawa et al. | |
| 2002/0019908 A1 | 2/2002 | Reuter et al. | |
| 2002/0019920 A1 | 2/2002 | Reuter et al. | |
| 2002/0019922 A1 | 2/2002 | Reuter et al. | |
| 2002/0019923 A1 | 2/2002 | Reuter et al. | |
| 2002/0026558 A1 | 2/2002 | Reuter et al. | |
| 2002/0029326 A1 | 3/2002 | Reuter et al. | |
| 2002/0065864 A1 | 5/2002 | Hartsell et al. | |
| 2002/0087544 A1 | 7/2002 | Selkirk et al. | |
| 2002/0103889 A1 | 8/2002 | Markson et al. | |
| 2002/0112113 A1 | 8/2002 | Karpoff | |
| 2002/0133735 A1 | 9/2002 | McKean et al. | |
| 2002/0156887 A1 | 10/2002 | Hashimoto | |
| 2002/0156984 A1 | 10/2002 | Padovano | |
| 2002/0156987 A1 | 10/2002 | Gajjar et al. | |
| 2002/0174306 A1 | 11/2002 | Gajjar et al. | |
| 2002/0178335 A1 | 11/2002 | Selkirk et al. | |
| 2002/0188592 A1 | 12/2002 | Leonhardt et al. | |
| 2002/0188711 A1 | 12/2002 | Meyer et al. | |
| 2002/0194523 A1 | 12/2002 | Ulrich et al. | |
| 2003/0037071 A1 | 2/2003 | Harris et al. | |
| 2003/0037127 A1 | 2/2003 | Shah et al. | |
| 2003/0051109 A1 | 3/2003 | Cochran | |
| 2003/0056038 A1 | 3/2003 | Cochran | |
| 2003/0079018 A1 | 4/2003 | Lolayekar et al. | |
| 2003/0079019 A1 | 4/2003 | Lolayekar et al. | |
| 2003/0093541 A1 | 5/2003 | Lolayekar et al. | |
| 2003/0093567 A1 | 5/2003 | Lolayekar et al. | |
| 2003/0097607 A1 | 5/2003 | Bessire | |
| 2003/0101228 A1 | 5/2003 | Busser et al. | |
| 2003/0115432 A1 | 6/2003 | Biessener et al. | |
| 2003/0126327 A1 | 7/2003 | Pesola et al. | |
| 2003/0145168 A1 | 7/2003 | LeCrone et al. | |
| 2003/0145169 A1 | 7/2003 | Nagasawa | |
| 2003/0158999 A1 | 8/2003 | Hauck et al. | |
| 2003/0167419 A1 | 9/2003 | Yanai et al. | |
| 2003/0182525 A1 | 9/2003 | O'Connell | |
| 2003/0200387 A1 | 10/2003 | Urabe et al. | |
| 2003/0204597 A1 | 10/2003 | Arakawa et al. | |
| 2003/0212854 A1 | 11/2003 | Kitamura et al. | |
| 2003/0212860 A1 | 11/2003 | Jiang et al. | |
| 2004/0003022 A1 | 1/2004 | Garrison et al. | |
| 2004/0049553 A1 | 3/2004 | Iwamura et al. | |
| 2004/0054850 A1 | 3/2004 | Fisk et al. | |
| 2004/0064610 A1 | 4/2004 | Fukuzawa et al. | |
| 2004/0064641 A1 | 4/2004 | Kodama | |
| 2004/0088417 A1 | 5/2004 | Bober et al. | |
| 2004/0123180 A1 | 6/2004 | Soejima et al. | |
| 2004/0143832 A1 | 7/2004 | Yamamoto et al. | |
| 2004/0148443 A1 | 7/2004 | Achiwa | |
| 2004/0172510 A1 | 9/2004 | Nagashima et al. | |
| 2004/0230980 A1 | 11/2004 | Koyama et al. | |
| 2004/0260875 A1 | 12/2004 | Murotani et al. | |
| 2004/0260966 A1 | 12/2004 | Kaiya et al. | |
| 2005/0010743 A1 | 1/2005 | Tremblay et al. | |
| 2005/0081009 A1 | 4/2005 | Williams et al. | |
| 2005/0240741 A1 | 10/2005 | Nagasawa et al. | |
| 2007/0016754 A1 * | 1/2007 | Testardi | 711/206 |

FOREIGN PATENT DOCUMENTS

| | | |
|---|---|---|
| JP | 11-184641 | 7/1999 |
| JP | 2000-242434 | 9/2000 |
| JP | 2000/293317 | 10/2000 |
| JP | 2000-347811 | 12/2000 |
| JP | 2001/067187 | 3/2001 |
| JP | 2001-075853 | 3/2001 |
| JP | 2001-312483 | 11/2001 |
| JP | 2002/157091 | 5/2002 |
| JP | 2002/230246 | 8/2002 |
| WO | 97-09676 | 3/1997 |
| WO | 03/027886 | 4/2003 |
| WO | 03/030431 | 4/2003 |
| WO | 03/030449 | 4/2003 |

OTHER PUBLICATIONS

"Network Attached Storage", Product White Paper, Feb. 2002, Sony Electronics Inc., (2002).

Sarkar et al, "Internet Protocol storage area networks" IBM Systems Journal, 2003, vol. 42, No. 2, pp. 218-231.

"Introduction to Storage Pooling, Consolidation Storage Resources with DataCore SANsymphony Software", White Paper, DataCore Software, updaged Jul. 2003, pp. 1-8.

"SAN Virtualization Guidelines", DataCore Software Corporation, 2000, pp. 1-9.

Anderson et al, "Hippodrome: Running Circles Around Storage Adminisration", Proceedings of Conference on File and Storage Technologies (FAST '02), Jan. 2002, pp. 175-188.

U.S. Appl. No. 60/268,694, filed Feb. 13, 2001, N. Shah et al.

Search Report, EP 07000027.8-1245, Jun. 6, 2007.

Japanese Office Action, JP 2002-333540, Nov. 6, 2007 (with English translation).

* cited by examiner (S621) judged as being not same by user's order/communication failure (time out)
(S622) above steps (S611) to (S614) is progressed
(S623) only update data corresponding to those being ON in the bit map is transferred during re-synchronization

| Cache Memory Address Number | Left in Cache Memory? |
|---|---|
| 3A21 | 1 |
| 2A55 | 0 |
| . | . |
| . | . |

| Cache Memory Remaining Amount | 5MB |
|---|---|

| Role to Be Recognized by the Program | Logic Volume |
|---|---|
| copy source | second logic volume |
| copy destination | first logic volume |

| Role to Be Recognized by the Program | Logic Volume |
|---|---|
| copy source | first logic volume |
| copy destination | second logic volume |

| Role to Be Recognized by the Program | Logic Volume |
|---|---|
| for storing old data | second logic volume |
| for storing new data | first logic volume |

| Role to Be Recognized by the Program | Logic Volume |
|---|---|
| for storing old data | first logic volume |
| for storing new data | second logic volume |

LUN Map Information Table

| Port ID | Imaginary LUN | Target WWN | Mapping LUN |
|---|---|---|---|
| 010001 | 0 | EEFFGGHH0000001b | 0 |
| 010006 | 1 | EEFFGGHH0000001b | 1 |
|  |  |  |  |

Reservation Information Table

| Host Computer WWN | Reservation Key | LUN | Reservation Attribute |
|---|---|---|---|
| XXYYZZAA0000a1ff | A000001 | 1 | 0 |
| aa165426XX11111f2a | B800001 | 8 | 1 |
|  |  |  |  |

~2400

※Reservation Attribute
  0: Read/Write impossible
  1: Read possible/Write impossible when key is matched
  2: Read/Write possible when key is matched

FIG. 24

METHOD FOR CONTROLLING STORAGE SYSTEM, AND STORAGE CONTROL APPARATUS

CROSS-REFERENCE TO RELATED APPLICATIONS

This is a continuation application of U.S. Ser. No. 10/424,563, filed Apr. 25, 2003 now U.S. Pat. No. 7,051,121.

The present application claims priorities upon Japanese Patent Application No. 2002-127058 filed on Apr. 26, 2002 and Japanese Patent Application No. 2002-333540 filed on Nov. 18, 2002, which are herein incorporated by reference.

BACKGROUND OF THE INVENTION

1. Field of the Invention

The present invention relates to a method for controlling a storage system and to a storage control apparatus.

2. Description of the Related Art

In recent years, the environment surrounding information systems is rapidly changing such as the progress of information technology (IT) and measures for the shift to broadband. Along with this, the rapid increase of the amount of data handled is a serious problem in various occasions.

To deal with such an increase of the amount of data, storage systems operated in data centers are being subjected to larger capacities and higher performances of the storage control apparatuses such as disk array units. Therefore, for example, in data centers, introductions of and replacements with storage control apparatuses having higher performances and larger capacities are frequently carried out in order to respond to the rapid shift to larger capacities of storage control apparatuses.

There are methods for introducing a storage control apparatus, such as the ones in which the operation using the old storage control apparatuses has been completely shifted to the operation using only the newly introduced storage control apparatuses, and the ones in which the operation is carried out where the old storage control apparatuses coexist with the newly introduced storage control apparatuses.

As one of the former methods, there is a technology described in Japanese Patent Application Laid-open (Kokai) Publication No. Hei10-508967. In this method, all the data can be operated by the new storage control apparatuses having a higher performance and a larger capacity, however, effective use of the old storage control apparatuses cannot be facilitated.

On the other hand, in one of the latter methods, the effective use of the old storage control apparatuses can be facilitated. However, the number of the storage control apparatuses directly connected to networks becomes necessarily increased because both of the new and the old storage control apparatuses coexist, and network structure information must be re-constructed because the new storage control apparatuses have been introduced to the existing networks. Therefore, an increase in management load imposed by the shift and the operation is inevitable.

SUMMARY OF THE INVENTION

One object of the invention is to facilitate effective use of old storage control apparatuses when, for example, introducing new storage control apparatuses to an existing storage system.

Another object of the invention is to facilitate the use of old storage control apparatuses without increasing the management load of the storage system after introducing new storage control apparatuses. Yet another object of the invention is, in that situation, to make specification changes and modifications to the old storage control apparatuses unnecessary or minimal.

Further object of the invention is to enable the use of storage control apparatuses designed for being used directly connected to a host computer without any modification or with minimal necessary specification changes not only when introducing new storage control apparatuses to an existing storage system but also when operating a storage control apparatus which is connected to another storage control apparatus.

In order to achieve the above and other objects, an aspect of the invention provides a method for controlling a storage system including a host computer, and a first and a second storage control apparatuses each having a function for receiving a data input/output request transmitted from the host computer and executing a data input/output process for a storage device in response to the data input/output request received, comprising:

connecting a first communication path between the host computer and the first storage control apparatus to each other;

connecting a second communication path between the first storage control apparatus and the second storage control apparatus to each other;

receiving by the first storage control apparatus a first data input/output request transmitted from the host computer through the first communication path;

when the first storage control apparatus has judged that the first data input/output request is not to be handled by the first storage control apparatus, transmitting by the first storage control apparatus a second data input/output request corresponding to the first data input/output request, to the second storage control apparatus through the second communication path; and by the second storage control apparatus, receiving the second data input/output request and executing a data input/output process corresponding to the second data input/output request received.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 12 shows a table for managing flags being related to cache addresses designating storage positions of the new data, on a cache memory, according to one embodiment of the invention;

FIG. 13 shows a table for managing the remaining amount of the cache memory, according to one embodiment of the invention;

FIG. 14 illustrates a situation where the first logic volume is set as a copy source and a second logic volume is set as a copy destination, according to one embodiment of the invention;

FIG. 15 illustrates a situation where the first logic volume is set as the copy destination and the second logic volume is set as the copy source, according to one embodiment of the invention;

FIG. 16 illustrates a situation where the first logic volume is used for storing old data and the second logic volume is used for storing new data, according to one embodiment of the invention;

FIG. 17 illustrates a situation where the first logic volume is used for storing the new data and the second logic volume is used for storing the old data, according to one embodiment of the invention;

FIG. 23 shows an LU map information table, according to one embodiment of the invention;

FIG. 24 shows a reservation information table according to one embodiment of the invention;

DESCRIPTION OF THE PREFERRED EMBODIMENTS

Figure 1:
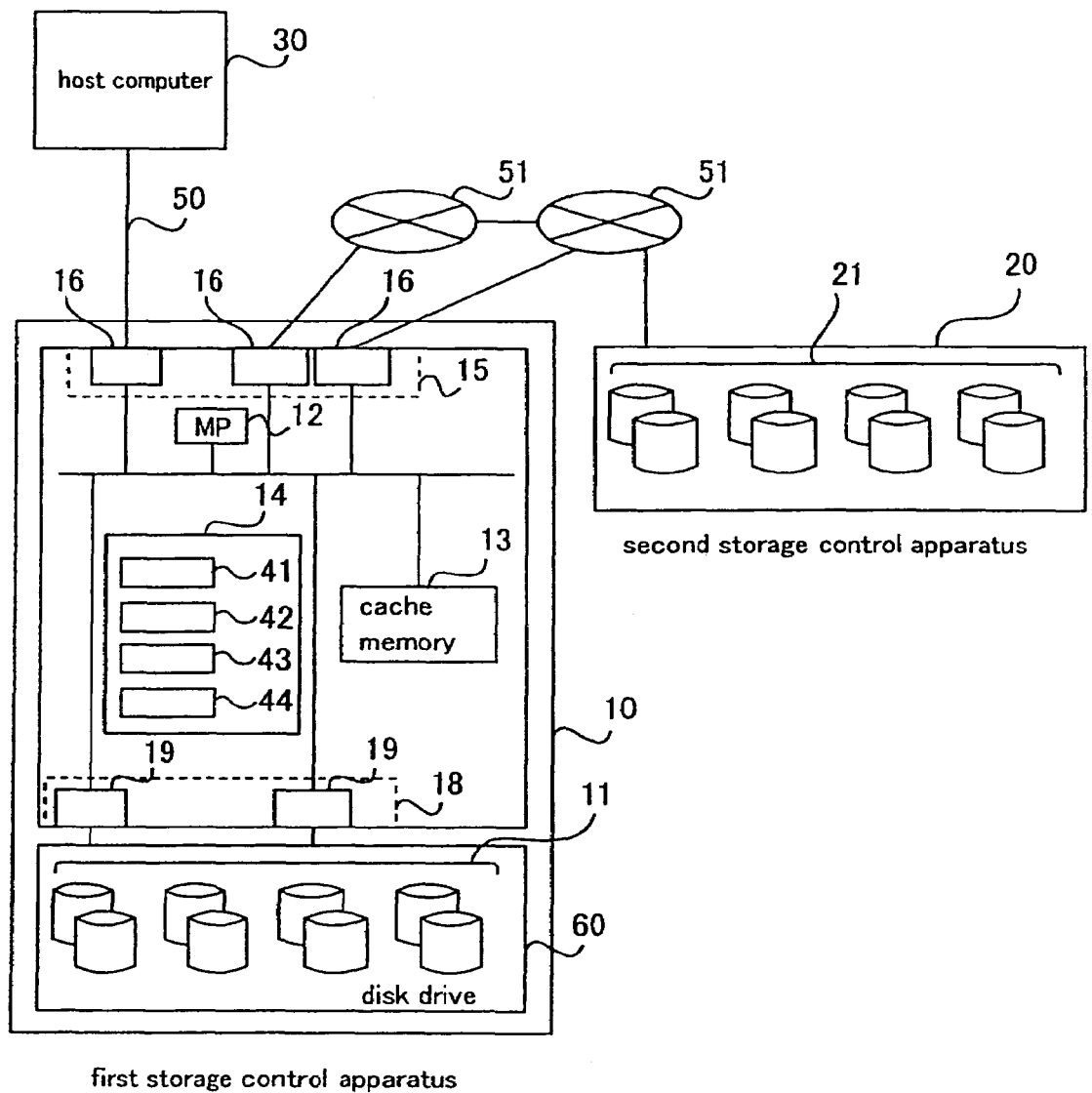
FIG. 1 shows the structure of a storage system according to one embodiment of the invention.

At least the following facts will be revealed by the description herein and the illustration of the accompanying drawings.

<Overview of Disclosure>

In the above invention, each of the first and the second storage control apparatuses is, for example, a storage apparatus provided to a user as one product such as a disk array apparatus. More specifically, the first storage control apparatus has a communication interface for connecting it to the first and the second communication means, a CPU for executing a data input/output process for a disk drive in response to the first data input/output request and a cache memory for storing data input to/output from the disk drive during the data input/output process.

The second storage control apparatus has a communication interface for connecting it to the second communication means, a CPU for executing a data input/output process for the storage device in response to the second data input/output request and a cache memory for storing data input to/output from the disk drive during the data input/output process.

Each of the first and the second storage control apparatuses operates as one single disk array apparatus when they are introduced to a network such as, for example, SAN, and can respectively receive as one single apparatus the data input/output request transmitted from the host computer and can execute a data input/output process in response to the data input/output request, to a storage device such as an integrated or externally-connected disk drive.

In the above structure, the first storage control apparatus and the second storage control apparatus are connected in series when seen from the host computer and, in this situation, the second storage control apparatus can be operated as an apparatus for extending the functions of, for example, the first storage control apparatus. This will be described more specifically. The first storage control apparatus receives from the host computer also a data input/output request directed to the second storage control apparatus as the first data input/output request in addition to a data input/output request directed to itself through the first communication path (corresponding to a first network described later) constituted of, for example, SAN. At this stage, if the received data input/output request is directed to the second storage control apparatus, the first storage control apparatus transmits the data input/output request to the second storage control apparatus through a second communication path (corresponding to a second network described later). That is, the first storage control apparatus functions as a relay apparatus between the host computer and the second storage control apparatus.

The second data input/output request relayed by the first storage control apparatus to the second storage control apparatus can be arranged such that it is transmitted in a format or protocol as in the first data input/output request received by the first storage control apparatus from the host computer, or such that it is transmitted in a format or protocol that has been changed in the first storage control apparatus into that of the second storage control apparatus. When it is arranged that communications between the first storage control apparatus and the second storage control apparatus are carried out using SCSI command conforming to ANSI (American National Standards Institute) or a standardized or normalized format or protocol, no special specification is required as a part of the structure of the second storage control apparatus as far as the second storage control apparatus has a standard communication interface. Therefore, in a storage center such as, for example, an IDC (Internet Data Center), even when a change in operation has been carried out in which the first storage control apparatus has been introduced as a new-model disk array apparatus and the old disk array apparatus that has been used is used being connected in series to the first storage control apparatus, no special specification change or modification is required for the second storage control apparatus. When the second storage control apparatus is an optional block device (an apparatus for random accesses represented by a disk apparatus), the invention can be applied. That is, when the second storage control apparatus is a large-scale storage control apparatus having high-level control functions equivalent to those of the first storage control apparatus, i.e., an optical disk apparatus with a block access interface, the invention can be applied.

It can be arranged that the first storage control apparatus stores information concerning a storage device for which the second storage control apparatus executes data input/output processes and the first storage control apparatus determines based on the stored information concerning the storage device whether it will transmit to the second storage control apparatus the second data input/output request corresponding to the first data input/output request.

As the example of the information concerning the storage device, there is information described in structure information management table described later. As practical examples, there is management information of storage area of one or more logic volume(s) organized on a storage area provided by a storage device, information concerning the performance of the logic volume, information concerning storage capacities and information concerning remaining amounts.

For example, when the first data input/output request is a data write-in request, the determination of whether to transmit the second data input/output request to the second storage control apparatus or not is carried out based on whether the data size of the data to be written in the logic volume of the second storage control apparatus in response to the data write-in request is within the range of the storage capacity of the logic volume. Furthermore, for example, when it has been determined that the data input/output request cannot be normally processed in the second storage control apparatus because, for example, the size of the data to be written in exceeds the capacity of the logic volume, the first storage control apparatus does not relay the second data input/output request to the second storage control apparatus.

In this manner, since it is arranged that the first storage control apparatus executes the process that should be originally executed by the second storage control apparatus, taking the role of the second storage control apparatus, even in a structure in which the second storage control apparatus is connected in series to the first storage control apparatus as described above, no special mechanism is required to be provided to the second storage control apparatus. According to the above function, the logic volume in the second storage control apparatus is provided to the host computer as if the logic volume were a logic volume of the first storage control apparatus.

It can be arranged that the first storage control apparatus stores access limit information concerning a storage device for which the second storage control apparatus executes data input/output processes, and the first storage control apparatus, when it has received the first data input/output request, determines by referring the contents of the received request to the access limit information whether to transmit to the second storage control apparatus the second data input/output request corresponding to the first data input/output request or not. There can be cases where the access limit information stored by the first storage control apparatus is, for example, registered from a management computer connected to the first storage control apparatus, or created and stored by the first storage control apparatus based on the received access limit information or the information as the basis of the access limit information that has been transmitted from the second storage control apparatus to the first storage control apparatus.

More specifically, for example, it is arranged that, when the second storage control apparatus organizes one or more logic volume (s) on a storage area provided by the storage device for which the second storage control apparatus itself executes data input/output processes, the first storage control apparatus stores the correlation X between IDs given to each host computer and an ID of the logic volume to which the host computer can make access and the first storage control apparatus determines whether to transmit the second data input/output request to the second storage control apparatus by referring the correlation between the ID of the host computer that is the source of the request described in the first data input/output request and the logic volume to which a data input/output process of the request described in the first data input/output request is directed, to the correlation X.

For example, in a storage system operated in an IDC, a storage control apparatus such as a disk array apparatus is not so rarely operated such that it carries out services to a plurality of host computers. In this case, each host computer often limits the storage control apparatuses that can access to that host computer. The access limit is generally carried out by, for example, managing the combinations such as port numbers or switch numbers of WWN or Fiber Channel switches such as zoning or LU masking when a host computer and storage control apparatuses are connected by SAN. In short, in this method, it is arranged that the first storage control apparatus executes the processes concerning the access limit taking the role of the second storage control apparatus when such access limit is required to be carried out between the host computer and a logic volume of the second storage control apparatus.

It can be arranged that a plurality of routes are included in the second communication path, the first storage control apparatus receives information concerning the second communication path from a relay apparatus existing on the second communication path and the first storage control apparatus determines, based on the information, a route for transmitting the second data input/output request. The information concerning the second communication path is, for example, network topology information, information of nodes in the network etc. conforming to the Fiber Channel standard, the SCSI standard or the ISCSI standard. The relay apparatus is, for example, a Fiber Channel switch, a Fiber Channel director, a Fiber Channel hub, an iSCSI router, an iSCSI switch etc.

The determination of the route is carried out based on at least any one of the conditions such as performance, reliability and stability of the plurality of paths grasped based on the information concerning the second communication path.

It can also be arranged that each of the first and the second storage control apparatuses respectively organizes one or more logic volume (s) on a storage area provided by the storage device for which the first and the second storage control apparatuses execute respective data input/output processes, the second storage control apparatus has a second logic volume being the target of data input/output processes of the second storage control apparatus and storing data of the first logic volume being the target of data input/output processes of the first storage control apparatus, the first storage control apparatus receives a data input/output request from the host computer and updates the contents of the first logic volume in response to the received request, the first storage control apparatus transmits to the second storage control apparatus a data input/output request instructing to the second logic volume an execution of a data update process corresponding to the updating, the second storage control apparatus receives the data input/output request and updates the contents of the second logic volume in response to the received request, and the first storage control apparatus stores information for grasping data not yet reflected on a logic volume of the second logic volumes among the data in the first logic volume. The information for grasping data not yet reflected is, for example, information describing whether the data in the first logic volume is reflected on the second logic volume in units of area organized in zones on a storage area in the first logic volume.

The information grasped in this manner is used, for example, in a case where updating to the second logic volume has been impossible due to a network failure etc., however, the failure has been recovered thereafter and data not yet reflected on the second logic volume is reflected. More specifically, for example, first, the first storage control apparatus transmits to the second storage control apparatus a data write-in request directed to the second logic volume concerning the data not yet reflected on the second volume, that has been grasped from the information for grasping the data not yet reflected, and the second storage control apparatus receives the data input/output request and executes to the second logic volume a write-in process corresponding to the data write-in request. In this manner, by arranging that the first storage control apparatus grasps the data not yet reflected on the second logic volume, it is not necessary to provide a special mechanism to the second storage control apparatus.

It can be arranged that each of the first and the second storage control apparatuses organizes one or more logic volume(s) on a storage area provided by a storage device for which the first and the second storage control apparatuses execute respective data input/output processes, the first storage control apparatus, when it writes new data in a first logic volume for which the first storage control apparatus executes data input/output processes, has transmitted to the second storage control apparatus a data write-in request of the old data stored in the area for write-in of the new data before the write-in process is executed, the second storage control apparatus receives the data write-in request and writes the old data in the second logic volume being the target of data input/output processes of the second storage control apparatus, the second storage control apparatus transmits to the first storage control apparatus the storage position of the old data in the second logic volume, and the first storage control apparatus stores the storage position of the new data in the first logic volume and the storage position of the old data in the second logic volume transmitted as above, relating both of them to each other.

A specific example for this method is, for example, a snapshot function described later. This function enables the data stored at a past time in the logic volume of the first storage control apparatus to be referred to. In this method, the data at a past time, i.e., the old data is stored in the logic volume of the second storage control apparatus.

Furthermore, the first storage control apparatus stores information designating the storage position of the old data in the logic volume of the second storage control apparatus by relating the information to the storage position where the old data was stored in the logic volume of the first storage control apparatus. By utilizing this, the first storage control apparatus can provide to the host computer the old data corresponding to the read-out request when, for example, a read-out request for an old data stored in a certain storage position in the first logic volume has been issued from the host computer.

It can be arranged that, when the first storage control apparatus has received from the host computer a data write-in request of new data for writing the new data to the first logic volume being the target of data input/output processes of the first storage control apparatus, the first storage control apparatus transmits to the second storage control apparatus the data write-in request of the new data without writing the new data to the first logic volume, the second storage control apparatus receives the data input/output request and writes the new data to a second logic volume being the target of data input/output processes of the second storage control apparatus, the second storage control apparatus transmits to the first storage control apparatus the storage position of the new data in the second logic volume, the first storage control apparatus stores the storage position of the old data in the first logic volume and the storage position in the second logic volume of the new data to be transmitted, relating both of them to each other. This method also relates to the snapshot function. However, in this method, being different from the former snapshot function, it is arranged that the old data is stored in the first storage control apparatus and the newest data in the logic volume of the first storage control apparatus is stored on the second storage control apparatus side.

As described above, according to the invention, the second storage control apparatus can be effectively utilized when the system is operated such that it has a copy of data, and when services such as the snapshot are provided. Especially when a first storage control apparatus is introduced as a substituting apparatus for the second storage control apparatus, the old-type second storage control apparatus can be effectively utilized continuously after introducing the first storage control apparatus. Therefore, effects such as reduction of the operation load of the storage system and reduction of the operation costs can be obtained.

<Overview of the System>

FIG. 1 shows the structure of a storage system described as one embodiment of the invention. This storage system is operated in, for example, an IDC. In the figure, a first storage control apparatus 10 and the second storage control apparatus 20 are disk array apparatuses that operate storage devices such as, for example, disk drives, in RAID (Redundant Array of Independent Disks) scheme, execute data input/output processes to the storage devices using a data input/output control unit 19 in response to data input/output requests such as data write-in requests and data read-out requests transmitted from a host computer 30, and function as data storage for the host computer 30. The first and the second storage control apparatuses 10, 20 may be sometimes also referred to as the "transfer storage control apparatus" and the "ordinary storage control apparatus," respectively in the specification. It is simply to more clearly distinguish the first and the second storage control apparatuses without intending to give any specific interpretation.

The host computer 30 is connected to the first storage control apparatus 10 through a first network 50 and the second storage control apparatus 20 is connected to the first storage control apparatus 10 through a second network 51. The first and the second networks are, for example, SANs (Storage Area Network) consisting of network devices conforming to the Fiber Channel. However, the networks are not limited to this but can be LANs (Local Area Network), general telephone lines, dedicated lines and networks of main frame system such as a protocol conforming to ESCON (Enterprise Systems CONnection) or FICON (Fiber CONnection).

The first storage control apparatus 10 receives a data input/output request transmitted from the host computer 30 through the first network 50. The second storage control apparatus 20 receives the data input/output request from the first storage control apparatus 10 through the second network 51. The second storage control apparatus 20 can be an apparatus having an equivalent performance as or a higher performance than that of the first storage control apparatus 10, or can be an apparatus having a performance lower than that of the first storage control apparatus 10.

As a case where the operation form shown in FIG. 1 is employed, there is, for example, a case where the operation of a storage system has been changed such that the first storage control apparatus 10 is newly introduced as a succeeding apparatus of the second storage control apparatus 20 to a storage system operated in a form in which the second storage control apparatus 20 is connected to the host computer 30, and the second storage control apparatus 20 functions as an apparatus for extending or supporting the functions of the first storage control apparatus 10.

The basic apparatus structure of the first storage control apparatus 10 will be described. The first storage control apparatus 10 is mounted with a storage apparatus 60 with one or more disk drive (s), as a storage device for providing a data storage area. The storage apparatus 60 can be structured such that it is connected to outside of the housing through, for example, a communication line conforming to the SCSI standard. As described above, the disk drive (s) are operated in RAID scheme, for example.

The first storage control apparatus 10 organizes one or more logic volume (s) 11 (hereinafter referred to as "logic volume") on a storage area provided by one or more disk drive (s). Each logic volume 11 is respectively given a specific identifier (hereinafter referred to as "LUN (logical unit number)"). A LUN for designating a data storage area is described in a data input/output request transmitted by the host computer 30 to the first storage control apparatus 10. The first storage control apparatus 10 has a function for providing a storage area to the host computer 30 by a LUN designation.

A microprocessor 12 (hereinafter referred to as "MP") executes the various processes of the first storage control apparatus 10 such as, for example, data input/output processes to the disk drive(s). MP 12 consists of one or more CPU(s). A microprocessor specialized in certain functions can be provided as MP 12. A cache memory 13 is mainly used for storing temporarily data input to/output from the disk drive(s) such as write-in data to the disk drive (s) and read-out data from the disk drive(s).

A control memory 14 is, for example, utilized as a working area for MP 12 or is used for storing various control data and tables. For example, a structure information management table 41 described later, a bit map 42, an access limit information table 43, an update management table 44 etc. are usually stored in this control memory 14.

An external interface 15 is a Fiber Channel interface. The external interface 15 connects the first storage control apparatus 10 to the first network 50 or the second network 51. The external interface 15 is provided with a plurality of ports 16 connected to ports of a Fiber Channel switch constituting a SAN. As is known in the field of the Fiber Channel, a WWN (world wide name) being an identifier for identifying an apparatus on a SAN is given to each port 16 of the external interface 15. The storage apparatus 60 is connected to the first storage control apparatus 10 through a device port 19 of a device interface 18.

The first storage control apparatus 10 has been described as above and the second storage control apparatus 20 also has a same structure as the first storage control apparatus 10 concerning the basic structure except the performance and the size of each component contained.

On the other hand, the host computer 30 is, for example, a personal computer, a work station or a general-purpose computer and is provided with a HBA (Host Bus Adapter) (not shown) being a Fiber Channel interface that is an interface for connecting to the first network 50. A WWN is also given to an HBA.

<Structure Information Management Table>

The second storage control apparatus 20 provides to the first storage control apparatus 10 its own logic volume as a logic volume of the first storage control apparatus 10. To realize this function, the first storage control apparatus 10 stores the structure information management table 41 shown in FIG. 2.

In this structure information management table 41, information concerning a logic volume handled by the first storage control apparatus 10 is described. In the structure information management table 41, information concerning not only the logic volume for which the first storage control apparatus 10 executes data input/output processes (hereinafter referred to as "first logic volume") but also the logic volume for which the second storage control apparatus 20 executes data input/output processes (hereinafter referred to as "second logic volume") is described (In FIG. 2, only the information concerning the second logic volume 21 is shown).

Figure 2:
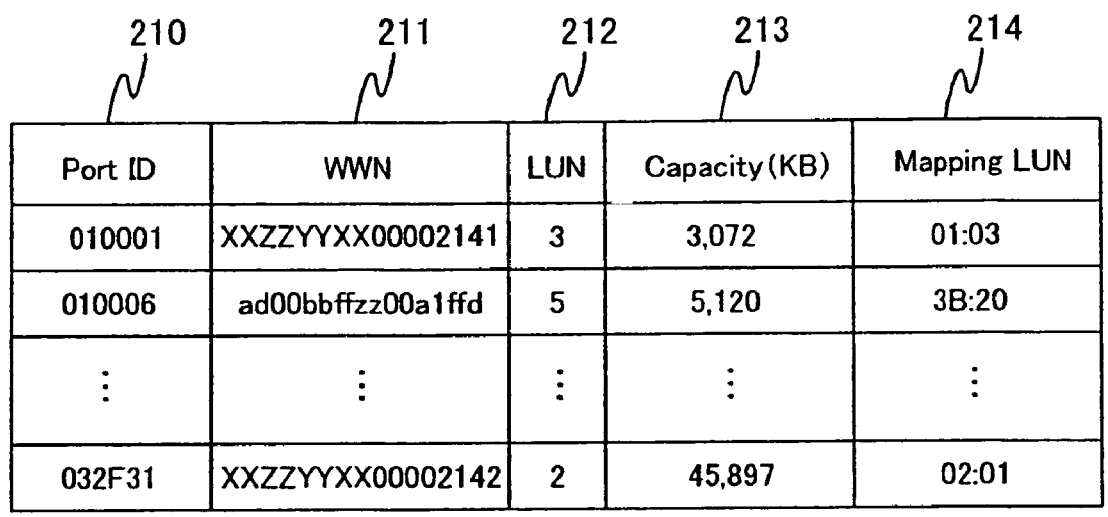
FIG. 2 shows a structure information management table according to one embodiment of the invention.

In FIG. 2, the port IDs of external interfaces connected to the logic volumes are described in a column 210 for port ID. The WNNs corresponding to the port IDs are described in a column 211 for WNNs. The LUNs for each logic volume are described in a column 212 for LUN. The capacities of storage areas provided by the first and the second logic volume 11 and 21 are described in a column 213 for capacity.

Identifiers of the second logic volume related to their ports and LUNs are described in a column 214 for mapping LUN. That is, when a description exists in the column for mapping LUN, that means the logic volume is the second logic volume 21, therefore, other logic volumes are the first logic volumes 11.

The contents of the structure information management table 41 is, for example, registered by an operator from a management computer (not shown) etc. connected to the first storage control apparatus 10 and the first storage control apparatus 10 has an information collection function (discovery function) described later. With this function, the first storage control apparatus 10 detects an apparatus connected to the second network 51 through the second network 51, transmits to the detected apparatus a transmission request of the information concerning the logic volumes of the detected apparatus, receives information transmitted as per the request and registers the information in the structure information management table 41.

The apparatus being the destination of the information for the apparatus exists on the second network 51 can be otherwise predetermined fixedly. Various settings for the conditions are possible such that only the products from a certain manufacturer are targeted by checking the model number of the apparatuses, that only the logic volumes having capacities more than a certain capacity are targeted and that only the logic volumes connected to a predetermined port are targeted.

The first storage control apparatus 10 provides to the host computer 30 the second logic volume 21 of the second storage control apparatus 20 as if it were the first logic volume 11 of the first storage control apparatus 10, using the structure information management table 41 described above and in a mechanism described later. That is, the host computer 30 can execute to the first storage control apparatus 10 a data input/output request directed to the logic volume 21 of the second storage control apparatus 20.

Since the first storage control apparatus 10 stores the structure information management table 41 as described above, the first storage control apparatus 10 can transmit a response by a proper response message to the host computer 30 not only when a data input/output request has been transmitted from the host computer 30 but also even when, for example, commands such as "Inquiry" or "Read Capacity" has been transmitted from the host computer 30 directed to the second logic volume 21.

<Data Input/Output Process>

Next, the operation of the storage system in a case where a data input/output request is issued from the host computer 30 to the first storage control apparatus 10 through the first network 50 directed to the first logic volume 11 or the second logic volume 21 will be described.

Figure 3:
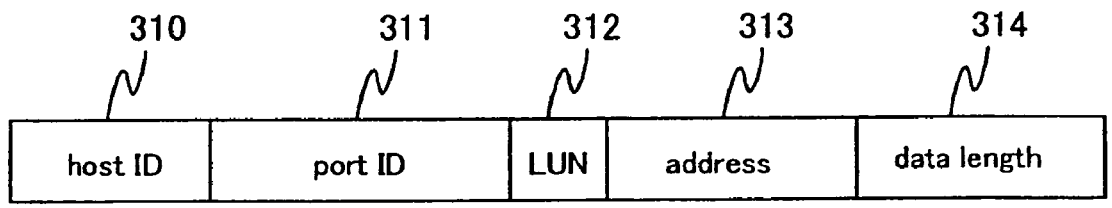
FIG. 3 shows a data format of a data input/output request transmitted from a host computer to a first storage control apparatus, according to one embodiment of the invention.

FIG. 3 shows an example of the data format of a data input/output request transmitted from the host computer 30 to the first storage control apparatus 10. In this figure, the column 310 for host ID shows an identifier of the host computer 30 having transmitted the data input/output request and, for example, the WWN of the HBA of the host computer 30 is described in it. The column 311 for port ID shows the port ID of a port connected to the logic volumes 11 and 21 that are the targets of process of the data input/output request. The column 312 for LUN shows the ID of a logic volume being the target of the process of the data input/output request. A column 313 for address and a column 314 for data length are set when, for example, the data input/output request is a data read-out request and, in this case, the head address containing the data of read-out source of the logic volumes 11 and 21 being the read-out sources is set in the column 313 for address and the data length of the data being the target of the read-out process is set in the column 314 for data length.

Figure 4:
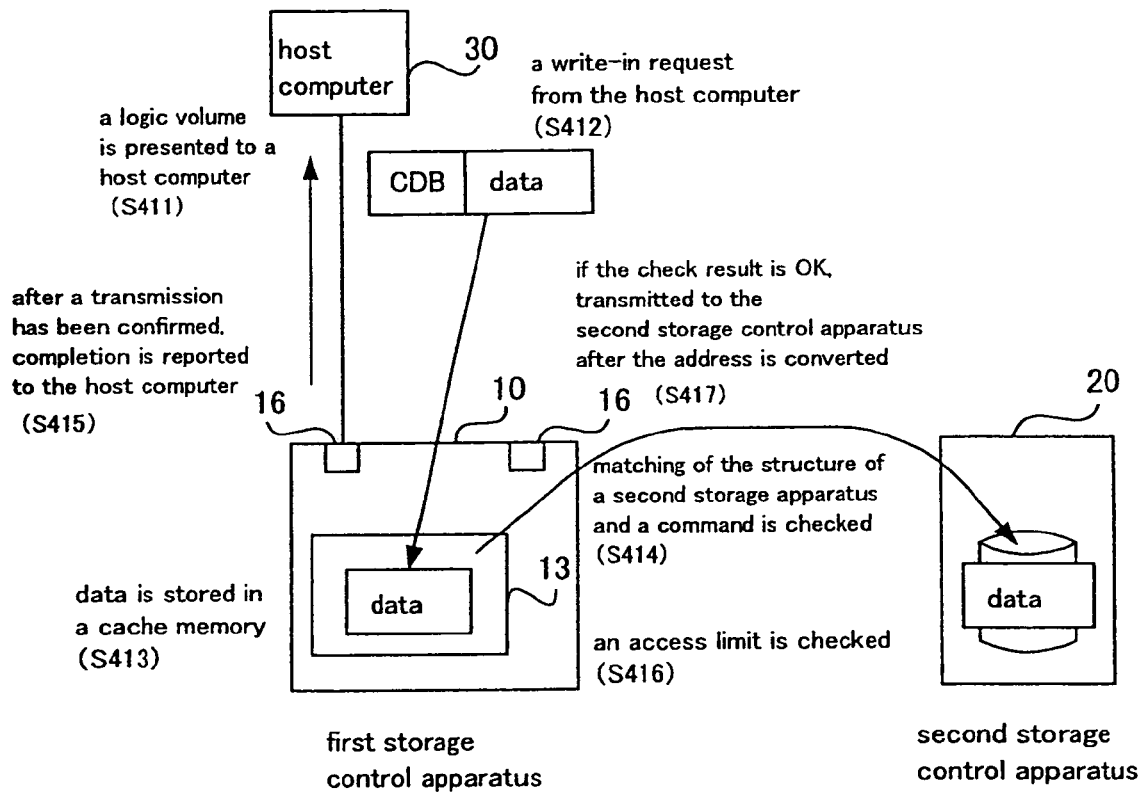
FIG. 4 illustrates processes of the storage system according to one embodiment of the invention when the data input/output request transmitted from the host computer is a data write-in request.

A process of the storage system for the case where the data input/output request transmitted from the host computer 30 is a data write-in request will be described with FIG. 4. First, the first storage control apparatus 10 receives a data write-in request from the host computer 30 through the first network 50 (S412) and stores in the cache memory 13 write-in target data received with the data write-in request (S413).

Next, the first storage control apparatus 10 refers to the structure information management table 41 to judge whether the data write-in request can be executed or not. The case where it can not be executed is, for example, that the logic volume being the target of the process of data input/output request does not exist or that, even when the logic volume exists, the size of the data being the target of the write-in process exceeds the size of the storage area of the logic volume.

The first storage control apparatus 10 checks referring to the structure information management table 41 whether the logic volume being the target of the process really exists, or whether the logic volume being the write-in destination has an enough capacity for being written the data to be written in by the data write-in request and judges whether a data input/output request corresponding to the data input/output request can be executed (S414). At this stage, if the first storage control apparatus 10 judges the data input/output request cannot be executed as a result of this judgment, it transmits to the host computer 30 a message in which that judgment is described and completes the process corresponding to the data input/output request (S415 in FIG. 4).

Furthermore, the first storage control apparatus 10 stores in the control memory 14 the access limit information table 43 in which the combinations of the port ID or WWN of the host computer 30 of the request source of the data input/output request, the first logic volume 11 or the second logic volume 21 to be the request target of the data input/output request and access type (read-out/write-in) are registered. There are cases where the contents of this access limit information table 43 is registered by an operator from a management computer (not shown) etc. connected to the first storage control apparatus 10, where the first storage control apparatus 10 receives the access limit information or information being the basis of that information, transmitted from the second storage control apparatus 20 and the first storage control apparatus 10 creates and stores the contents based on that information. The latter operation can be carried out, for example, when the second storage control apparatus 20 itself has a mechanism concerning an access limit function for the logic volume 21 of the second storage control apparatus 20.

The first storage control apparatus 10 executes an access limit process that is a process for checking whether the combination of the ID of the port having received the data input/output request or WWN of the host computer 30 being the source described in the data input/output request, and the port ID of the first logic volume 11 or the second logic volume 21 designated in the data input/output request as the write-in destination matches the authorized access conditions (S416).

Figure 5A:
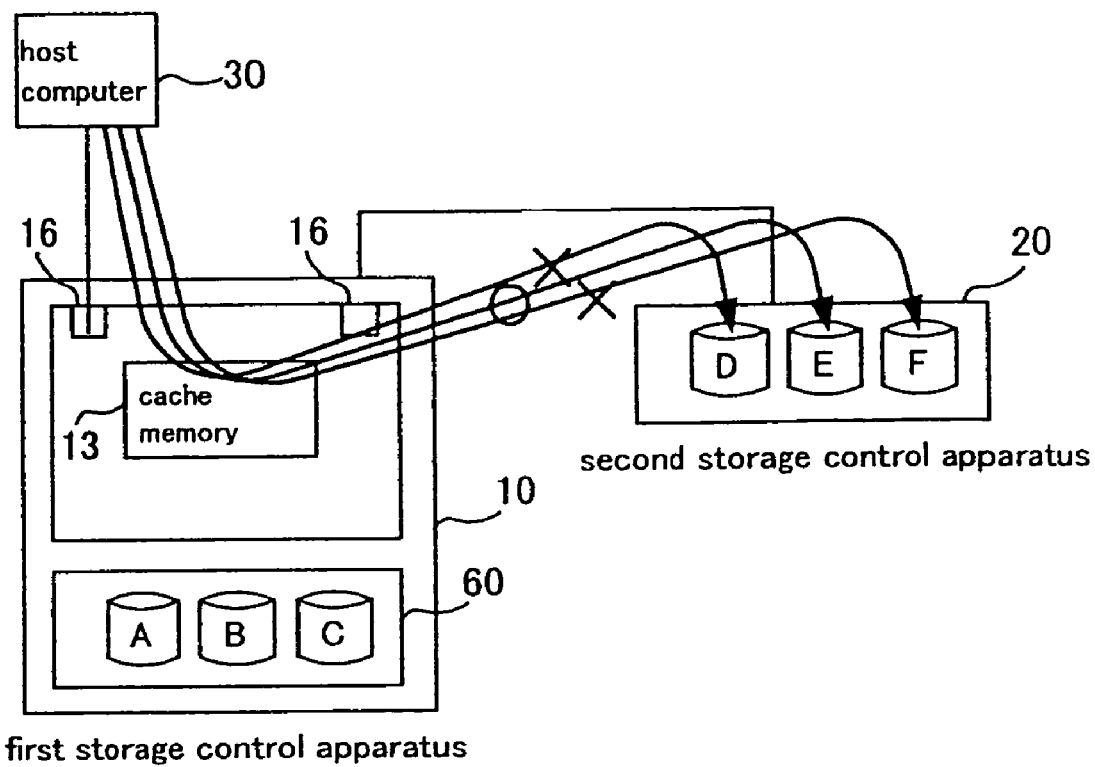
FIG. 5A and FIG. 5B respectively illustrates a concept of access limit process according to one embodiment of the invention.

The concept of an access limit process is shown in FIG. 5A. The first storage control apparatus 10 checks whether the data input/output request from the host computer 30 matches the access limit in the access limit information table 43 and, if they do not match to each other, does not execute any process corresponding to the data input/output request, transmits a message in which the result is described and completes the process corresponding to the data input/output request (S415).

The above processes concerning the access limit are executed not only when the logic volume being the target of the process of the data input/output request is the first logic volume 11 but also when the logic volume being the target is the second logic volume 21. That is, the first storage control apparatus 10 substitutes in carrying out a research of the access limit to the second logic volume 21.

Figure 5B:
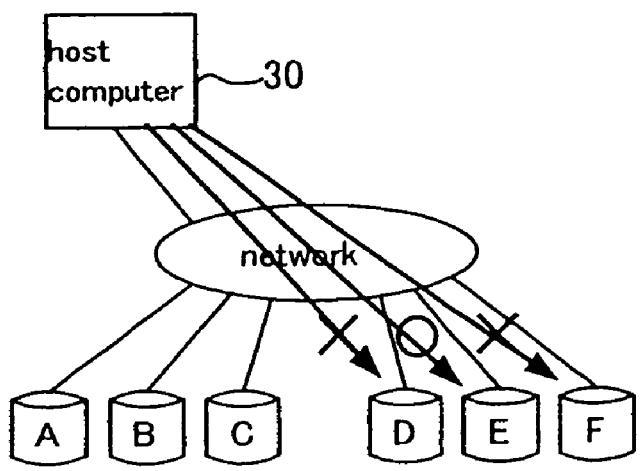

On the other hand, as shown in FIG. 5B, when seen from the host computer, there is no distinction whether the logic volume being the target of a data input/output request belongs to the first storage control apparatus 10 or to the second storage control apparatus 20. The host computer 30 simply grasps whether a logic volume existing on the network is accessible or not accessible.

As a result of the above processes, when the logic volume being the target of the process of the data input/output request has been judged to be possible to be written in (that is, the logic volume exists, its capacity is large enough and its access limit has no problem), the first storage control apparatus 10 transmits a data write-in request to the second storage control apparatus 20 (S417). The second storage control apparatus 20 receives this data write-in request and writes the write-in data in the second logic volume 21.

The data write-in request in this case conforms to the same protocol (for example, the data format is same) as that of the data write-in request directly received from the host computer 30 by the second storage control apparatus 20. Therefore, when the operation of the second storage control apparatus 20 is changed, because the first storage control apparatus 10 is newly introduced, such that the second storage control apparatus 20 functions as an apparatus for providing logic volumes to the first storage control apparatus 10, there is no need to carry out any change or modification especially for the apparatus structure and specification of the second storage control apparatus 20. Therefore, an effective use of the second storage control apparatus 20 becomes possible with the minimal effort and at a low cost.

The access limit function of the first storage control apparatus 10 described above can be applied in various environments such as the case where the second storage control apparatus 20 does not have any access limit function and the first storage control apparatus 10 dedicatedly support the access limit function of the second storage control apparatus 20 in addition to the case where the second storage control apparatus 20 originally has a function concerning the access limit.

The first storage control apparatus 10, when having transmitted a data input/output request to the second storage control apparatus 20, transmits to the host computer 30 a message to communicate the completion of the write-in process without waiting for the completion notice of the process of the data input/output request from the second storage control apparatus 20 (S415). Therefore, the host computer 30 can confirm quickly the response to the data input/output request and can start the following process quickly without a long waiting time.

A write-in process has been described as above. However, in the case of a read-out process from a logic volume, the process is also executed in a same mechanism except that data is transferred in the opposite direction in contrast to the above case for a write-in process. For data input/output requests except the ones for write-in and read-out processes, the first storage control apparatus 10 returns responses as usual to the host computer 30.

As described above, in the storage system, the host computer 30 accesses the second logic volume as if it were a logic volume in the first storage control apparatus 10. Furthermore, even when the logic volume being the target of a data input/output request is originally for the second storage control apparatus 20, the management load and the management cost for security can be minimized since the judgment of whether a data input/output request can be normally processed and management of access right setting etc. can be carried out concentrated and intensively in the first storage control apparatus 10. Furthermore, by executing the processes to be executed by the second storage control apparatus 20 using the first storage control apparatus 10, the process load on the second storage control apparatus 20 side can be reduced.

<Data Copy Function>

Next, a data copy function executed in this storage system will be described. The function described in this section is utilized for realizing functions such as, for example, data replication or data mirroring and is a function that works such that the second storage control apparatus 20 also has a logic volume having the same contents as that of a logic volume of the first storage control apparatus 10.

The first logic volume 11 being the copy source and the second logic volume 21 being the copy destination can be provided in a relation of 1:N in addition to in a relation of 1:1.

The case where they are provided in the relation of 1:1 will be described as an example for simplification of description. However, even in the case where they are provided in the relation of 1:N, the basic process can be executed similarly simply because a plurality of relations of 1:1 exist.

In order to realize the data copy function, for example, a mechanism for managing the difference of the contents between the first logic volume 11 and the second logic volume 21 is necessary as a preparation for the case where a communication failure occurs on the second network 51. As this mechanism, the one in which a bit map where a bit is related to each block or block group organized in zones in the storage area of a logic volume of the first storage control apparatus 10 is prepared and every bit for which a difference is generated between those logic volumes is made "on" is known.

Figure 6:
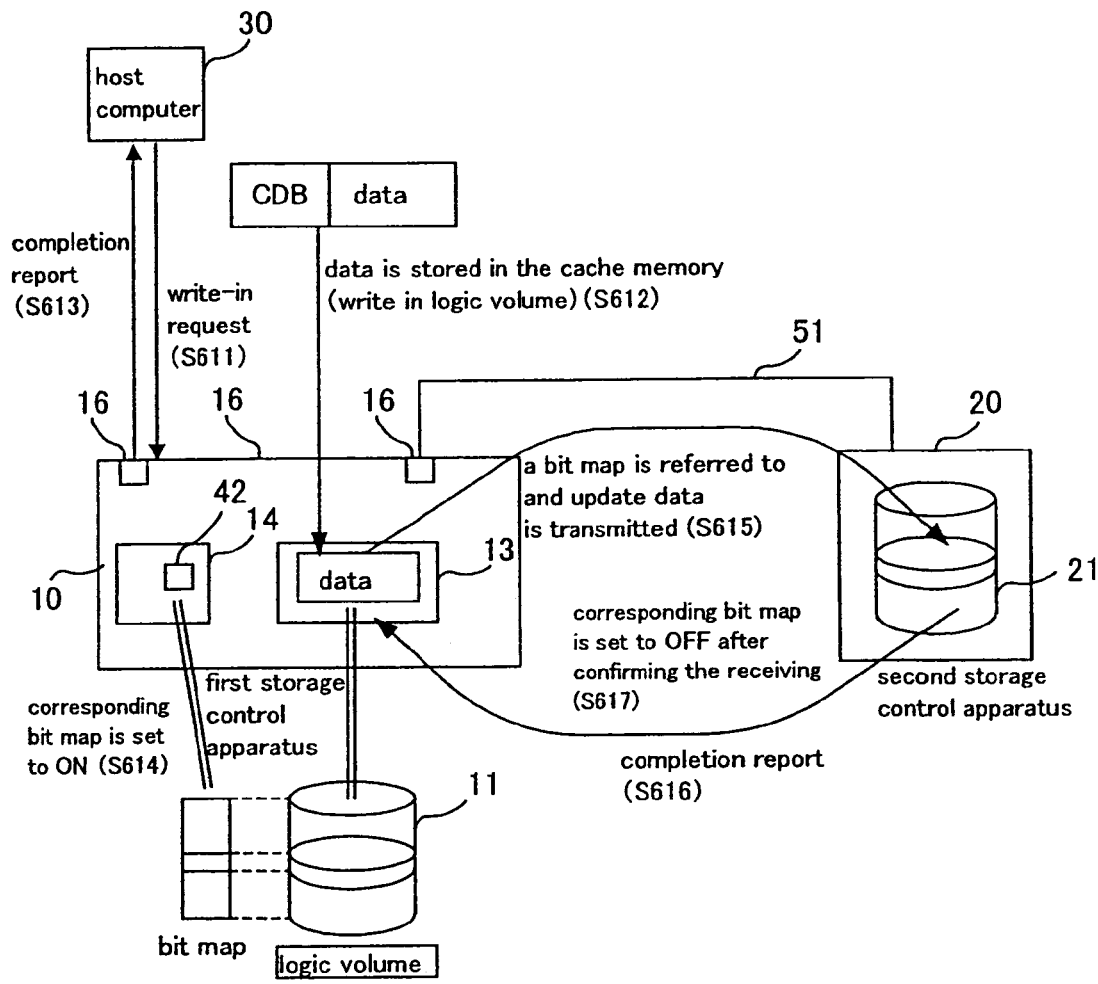
FIG. 6 illustrates processes of a storage system concerning its data copy function, according to one embodiment of the invention.

FIG. 6 illustrates processes of the storage system concerning the data copy function. When the first storage control apparatus 10 has received from the host computer 30 a data write-in request to the logic volume being the copy source (S611), it stores the received request in its own cache memory 13 (S612). The first storage control apparatus 10 transmits a write-in process completion report to the host computer 30 at the moment when the write-in data has been stored in the cache memory 13 (S613).

When the first storage control apparatus 10 has transmitted the Write-in process completion report to the host computer 30, it makes on the bits corresponding to the update address of the logic volume being the write-in destination of this write-in process in the bit map 42 (S614).

Next, the first storage control apparatus 10 starts the process for matching the contents of the logic volumes 11 and 21 being the copy source and the copy destination with each other at a proper timing such as the time when an instruction has been issued from a management computer (not shown).

First, the first storage control apparatus 10 refers to the bit map 42 and transmits to the second storage control apparatus 20 a write-in request of the data stored in a storage area of the logic volume 11 of the copy source corresponding to blocks or block groups that have discord in contents, i.e., that the bit is on (S615).

When the second storage control apparatus 20 has received the data write-in request and the write-in data, it writes the received write-in data to the targeted storage area of the second logic volume 21 being the copy destination and transmits to the first storage control apparatus 10 a write-in completion report (S616).

At the moment when the first storage control apparatus 10 receives the data write-in completion report from the second storage control apparatus 20, the first storage control apparatus 10 sets off the bit of the bit map 42 corresponding to the storage area of the data written in the copy destination (S617). That is, the contents of the bit map 42 are managed in real time such that only the bits corresponding to the storage area for the contents of the first logic volume 11 and the second logic volume 21 are different. In this manner, the contents of the logic volumes being the copy source and the copy destination are synchronized with each other.

It is not necessary that the storage capacities of the logic volumes being the copy source and the copy destination are always same. In the case where the logic volumes being the copy source and the copy destination are different as described above, for example, addresses are converted and stored in another volume, or the data size is reduced using a compression process and is stored.

In the above description, the first logic volume 11 is the copy source and the second logic volume 21 is the copy destination. However, in contrast to this, it may be structured that the copy source is the second logic volume 21 and the copy destination is the first logic volume 11.

<Re-Synchronization Process>

Next, a re-synchronization process executed for the case where the contents of the first logic volume 11 and the second logic volume 21 are different due to a failure of the second storage control apparatus 20 or the second network 51, etc. And, thereafter, the failure is recovered and it is possible to synchronize the contents of the logic volumes 11 and 21.

The first storage control apparatus 10 detects a failure of the second network 51 by, for example, a time-out of communication between the first and the second storage control apparatuses 10 and 20. The difference of the contents can be caused not only by the failure of the second network 51 but also by operations of a user such as back-up process and application tests.

First, the processes for the case where the first storage control apparatus 10 detects a failure of the second network 51 will be described. When the first storage control apparatus 10 has detected a failure, it switches the operation from the normal operation condition described above to a separated condition (S621) and stops a transmission process to the second storage control apparatus 20 of a data write-in request about update finite difference data. As to a write-in process to the first logic volume 11, the processes from (S611) to (S614) are executed (S622). Therefore, the bits on the bit map corresponding to the blocks or block groups updated during the separated condition are set to on and the difference between the first logic volume 11 and the second logic volume 21 is managed.

Next, when the failure has been recovered and the second logic volume 21 becomes available, first, the first storage control apparatus 10 transmits to the second storage control apparatus 20 a data write-in request directed to the second logic volume 21 about the data stored in a storage area of the first logic volume 11 corresponding to the blocks or block groups of which the bit in the bit map 42 is on.

When the second storage control apparatus 20 has received the data write-in request, it writes the write-in data received with the request to a storage area corresponding to a targeted logic volume. In this write-in process, for example, when the system is operated such that the data stored in a storage area of a certain address in the logic volume 11 being the copy source is stored in a storage area designated by the same address in the logic volume 21 being the copy destination, the data is stored in a storage area of the second logic volume 21 designated by the same address as the address in the first logic volume 11 where the data has been stored (S623).

In the above processes, it is arranged that the first storage control apparatus 10 transmits to the second storage control apparatus 20 only the data stored in the updated storage area. Therefore, the amount of the data transmitted to the second network 51 can be almost minimized. When the re-synchronization process of the contents of those logic volumes has been completed in this manner, the first storage control apparatus 10 re-starts the transmission of the data write-in request of the updated finite difference data.

The above processes are on the premise that the update of the logic volume 21 being the copy destination is not executed as far as the logic volume 11 being the copy source has not been updated. However, an update of the logic volume 11 being the copy destination may have been executed before an update of the logic volume 21 being the copy source is executed depending on a form of use of the storage system. In this case, the contents of those logic volumes cannot be re-synchronized using the bit map 42 and the re-synchronization process is executed, for example, in a manner in which all the data in the logic volume 11 of the first storage control apparatus 10 is transferred to the logic volume 21 of the second storage control apparatus 20.

It can be arranged that the update situation of the second logic volume 21 is managed by managing a bit map concerning the second logic volume 21. In this case, the bit map is stored, for example, in the control memory 14 of the first storage control apparatus 10, in a control memory (not shown) of the second storage control apparatus 20 or in the logic volume 21. Furthermore, in this case, re-synchronization can be executed by, for example, transferring the data stored in blocks or block groups that have been updated from the first logic volume 11 and writing it to the second logic volume 21.

<Snapshot>

(1) Snapshot Function 1

Next, snapshot function will be described. This function enables the data stored in a logic volume at a past time designated by a user to be obtained. Whether the snapshot function is operated or not can be set for each logic volume.

The case where the first storage control apparatus 10 operates the snapshot function for the first logic volume 11 will be described. The snapshot function described here is a function that stores in the second logic volume 21 old data stored in a storage area of the first logic volume 10 being the target of a write-in process and enables old data to be utilized afterward, for example, from the host computer 30 when a write-in process has been executed to the first logic volume with new data.

Figure 7:
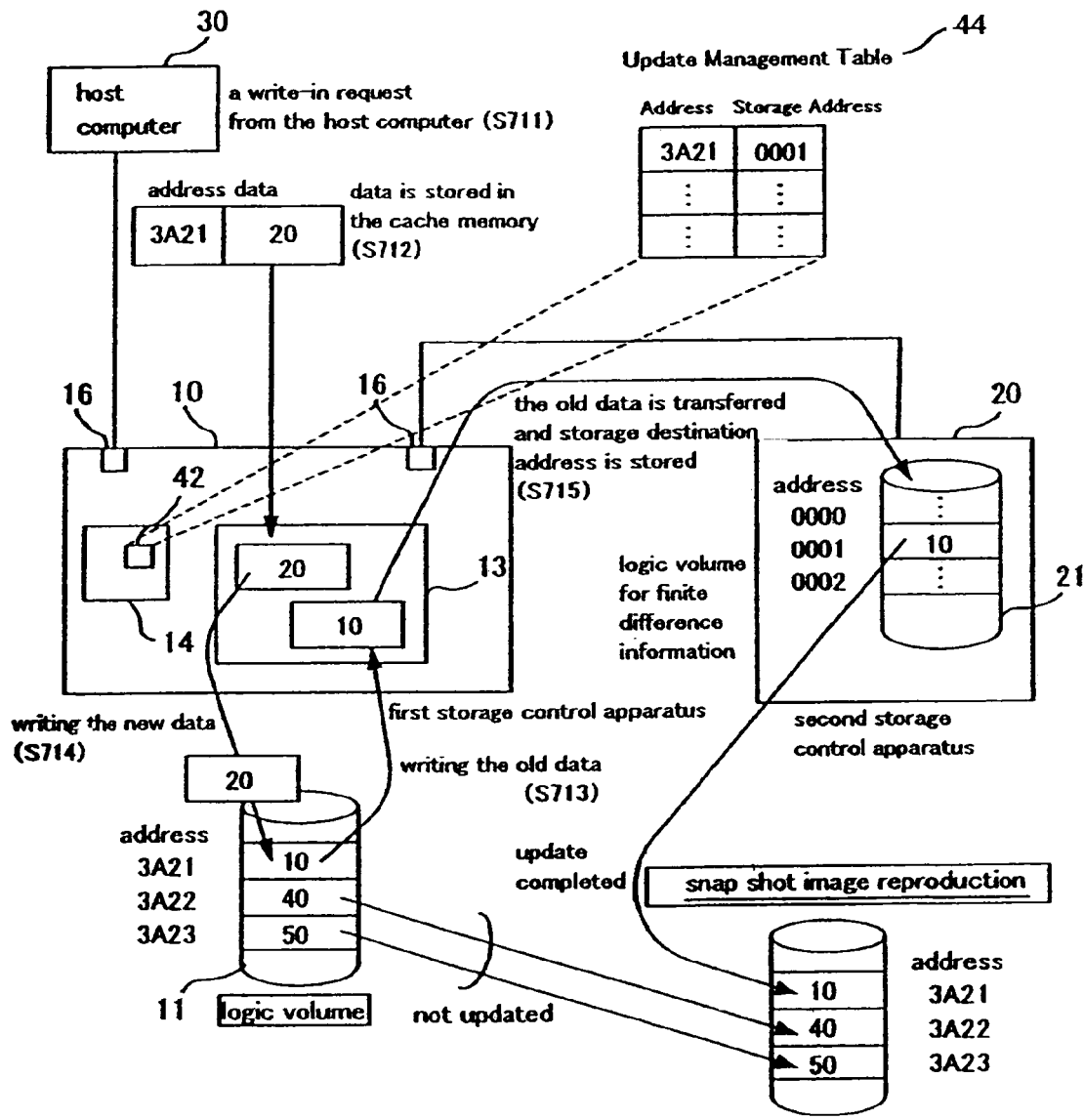
FIG. 7 illustrates a snapshot function according to one embodiment of the invention.

FIG. 7 illustrates the snapshot function in the storage system. In this process, a logic volume 21 for storing the old data for the snapshot function has been secured in the second storage control apparatus 20. In this case, the structure can be arranged that one logic volume 21 is shared for the snapshot for a plurality of the first logic volume 11 of the first storage control apparatus 10.

The first storage control apparatus 10 stores in the control memory 14 the update management table 44 in which the correlation is registered between addresses designating the storage area where writing has been effected among the storage areas of the first logic volume 11 and addresses of the second logic volume 21 which is a refuge for the old data stored in that storage area.

The mechanism for realizing the snapshot function will be described. First, when the first storage control apparatus 10 has received a data write-in request directed to the first logic volume 11 transmitted from the host computer 30 (S711), the first storage control apparatus 10 stores in the cache memory 13 the write-in data (new data) received with the data write-in request (S712).

Next, the first storage control apparatus 10 reads out the data already stored in the storage area of the first logic volume 11 being the destination of the data write-in process (old data) being the target of this data write-in process and stores the old data in the cache memory 13 (S713). Thereafter, the first storage control apparatus 10 writes the write-in data received from the host computer 30 (new data) in the storage area (S714).

The first storage control apparatus 10 transmits a write-in completion report to the host computer 30 at the moment when it has stored the write-in data in the cache memory 13. Therefore, the real write-in process of the write-in data in the first logic volume 11 may be executed after the write-in completion report has been transmitted.

Next, the first storage control apparatus 10 transmits the old data stored in the cache memory 13 to the second storage control apparatus 20. When the second storage control apparatus 20 has received the old data, the second storage control apparatus 20 stores the data in the second logic volume 21. At this stage, the second storage control apparatus 20 transmits the storage position of the second logic volume 21 where the old data is stored with an address indicating the original storage position in the logic volume 11 of the first storage control apparatus 10 where the old data has been stored (this address is received from the first storage control apparatus 10 with, for example, the write-in data). On the other hand, the first storage control apparatus 10 receives the transmitted storage position and stores it in the update management table 44 of the control memory 14 (S715). As described above, the old data (hereinafter referred to as "snapshot") is stored in the second logic volume 21 of the second storage control apparatus 20.

When, for example, the first storage control apparatus 10 has received from the host computer 30 a data read-out request for the first logic volume 11 being the target of creating a snapshot, the first storage control apparatus 10 executes a read-out process by an ordinary process from the first logic volume 11 of the first storage control apparatus 10 and transmits the read out data to the host computer 30.

On one hand, when, for example, the first storage control apparatus 10 has received from the host computer 30 a data read-out request for the old data of the logic volume 11 and an area corresponding to the storage area designated by the read-out request is stored in the update management table 44, the first storage control apparatus 10 transmits to the second storage control apparatus 20 a read-out request of the targeted data from the second logic volume 21. The second storage control apparatus 20, in response to this, transmits the targeted old data to the first storage control apparatus 10. Then, the first storage control apparatus 10 receives the transmitted old data and transmits it to the host computer 30.

On the other hand, when the storage area designated by the read-out request is not stored in the update management table 44, the first storage control apparatus 10 reads out the targeted data from the first logic volume 11 of the first storage control apparatus 10 and transmits it to the host computer 30.

(2) Snapshot Function 2

Next, another method for realizing the snapshot function will be described referring to FIG. 8.

In this method, when a data write-in request for the first logic volume 11 of the first storage control apparatus 10 has been transmitted from the host computer 30, the first storage control apparatus 10 writes write-in data (new data) to the second logic volume 21 of the second storage control apparatus 20 without executing any update of the first logic volume 11 itself. That is, different from the above-described method, in an ordinary write-in process, new data to be originally written in the first logic volume 11 is not written to the first logic volume 11 and the old data is kept stored as it is in the first logic volume 11 and the new data is stored in the second logic volume 21.

In this method, a data write-in request for the first logic volume 11 of the first storage control apparatus 10 has been transmitted from the host computer 30 and, when the first storage control apparatus 10 has received the data write-in request (S811), it stores in the cache memory 13 the write-in data (new data) transmitted with the data write-in request (S812).

Next, the first storage control apparatus 10 transmits to the second storage control apparatus 20 the new data stored in the cache memory 13 and a data write-in request for the new data. Then, the second storage control apparatus 20 having received this stores the new data in the second logic volume 21.

For the above case, as the addresses designating the storage area in the second logic volume 21 of the new data, there is, for example, an address where no new data has been stored yet is designated. This address is transmitted from the second storage control apparatus 20 to the first storage control apparatus 10 and the first storage control apparatus 10 stores the address in the update management table 44 relating it to an address designated as a write-in destination of the data write-in request (S813). This relating is carried out by, for example, exchanging between the first storage control apparatus 10 and the second storage control apparatus 20 the information necessary for the relating.

In a case where a snapshot is created as described above, when a data read-out request is issued from the host computer 30, the first storage control apparatus 10 first checks the update management table 44. Then, if the address of the read-out destination designated by the read-out request is not contained in the update management table 44, the first storage control apparatus 10 reads out the targeted data from the first logic volume 11 and transmits the data to the host computer 30.

On the other hand, if the address of the read-out destination is contained in the update management table 44, the first storage control apparatus 10 transmits to the second storage control apparatus 20 a read-out request for the data at the address of the second logic volume of the second storage control apparatus 20 stored in the update management table 44 being related to the address.

When the second storage control apparatus 20 has received the read-out request, the second storage control apparatus 20 reads out the data from the second logic volume 21 and transmits the data to the first storage control apparatus 10. When the first storage control apparatus 10 has received the data, it transmits the data to the host computer 30 (S814).

When, for example, the first storage control apparatus 10 has received from the host computer 30 a data read-out request for the old data of a certain first logic volume 11, and the storage area designated by the read-out request is not stored in the update management table 44, the first storage control apparatus 10 reads out the data from the logic volume 11 of the first storage control apparatus 10 and transmits the data to the host computer 30.

In the above description, it is arranged that the update management table 44 is stored in the control memory 14 of the first storage control apparatus 10, however, it can also be arranged that the update management table 44 is stored in a control memory (not shown) of the second storage control apparatus 20, the second logic volume 21 or another logic volume 21 in the second storage control apparatus 20. When it is arranged as described above, the snapshot function can be realized without providing any special mechanism to the second storage control apparatus 20.

(3) Reflecting of New Data

When the snapshot function 2 described above operates, the new data is not reflected on the first logic volume 11. However, there are times when old data becomes not necessary to be stored in the first logic volume 11 and new data stored in the second logic volume 21 is required to be reflected on the first logic volume 11 such as when, for example, the old data of the first logic volume 11 has finished its role due to the completion of user's work. Furthermore there are times when new data is required on the first logic volume 11 at a timing regularly or not regularly since the storage area of the second logic volume 21 is decreased by new data stored one after another in the second logic volume 21. Then, a mechanism for reflecting new data on the first logic volume 11 for these cases will be described.

Figure 9:
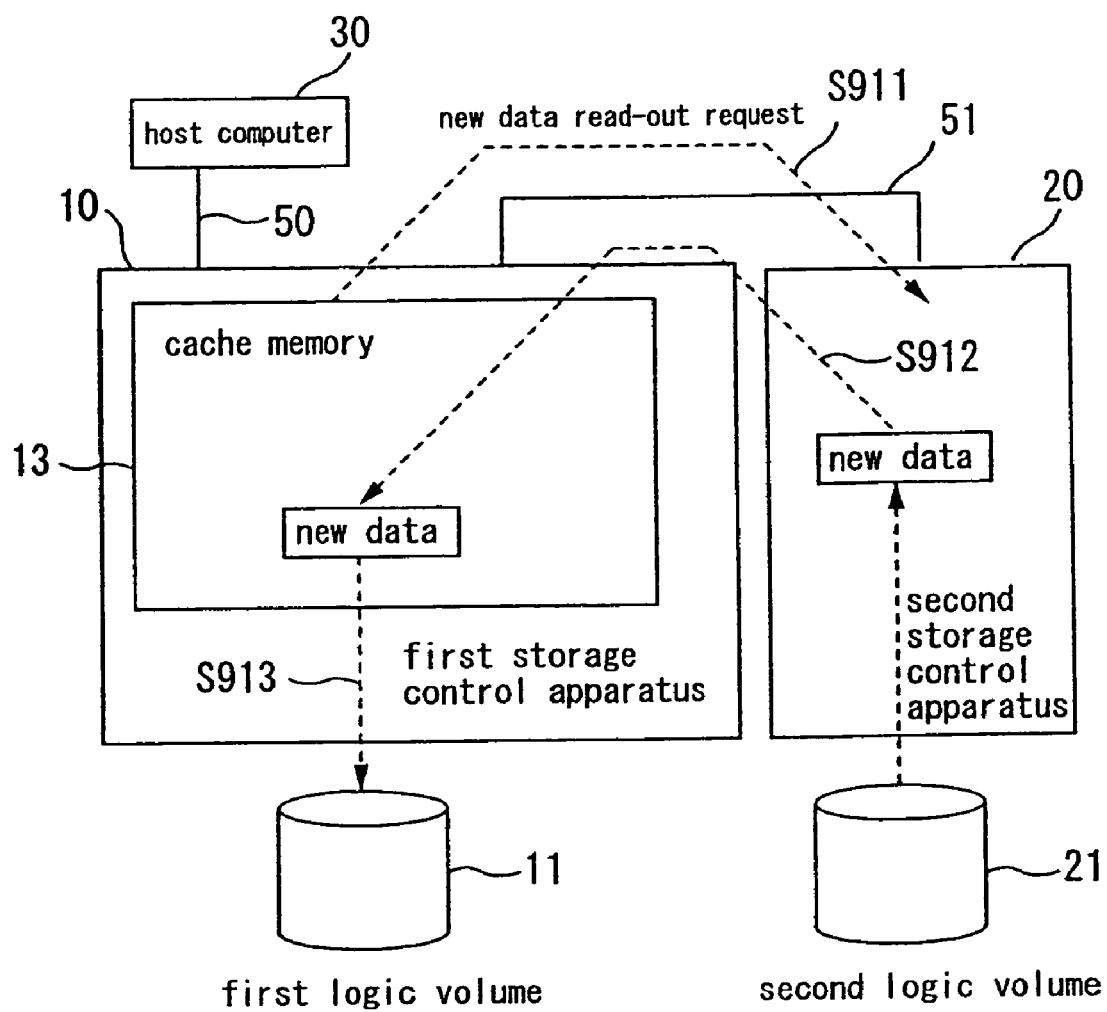
FIG. 9 illustrates a mechanism for reflecting new data on a first logic volume, according to one embodiment of the invention.

The description will be given referring to FIG. 9. First, a read-out request of new data is transmitted from the first storage control apparatus 10 to the second storage control apparatus 20 (S911). In this read-out request, information concerning the storage position of the new data in the second logic volume 21 is contained.

When the second storage control apparatus 20 has received the read-out request, the second storage control apparatus 20 reads out from the second logic volume 21 the new data stored in the storage position identified from the information and transmits the new data to the first storage control apparatus 10.

When the first storage control apparatus 10 has received the new data, the first storage control apparatus 10 stores the new data in the cache memory 13 (S912) and writes the new data in the storage position of the first logic volume 11 specified by the update management table 44 (i.e., the storage position in the first logic volume 11, where the new data should originally be stored, designated in the data write-in request transmitted from the host computer 30) (S913).

The new data is reflected on the first logic volume 11 by the above mechanism. As to new data, it can also be arranged that all the new data stored in the second logic volume 21 are reflected on the first logic volume 11 simultaneously at a certain timing, or that only the specific new data selected based on the conditions such as whether the time at which the new data was stored in the second logic volume 21 is before a predetermined time is reflected or not.

New data can be reflected on the first logic volume by the above mechanism for the cases where the old data in the first logic volume finishes its role due to the completion of user's work, or where storage area of the second logic volume is required to be released.

Figure 8:
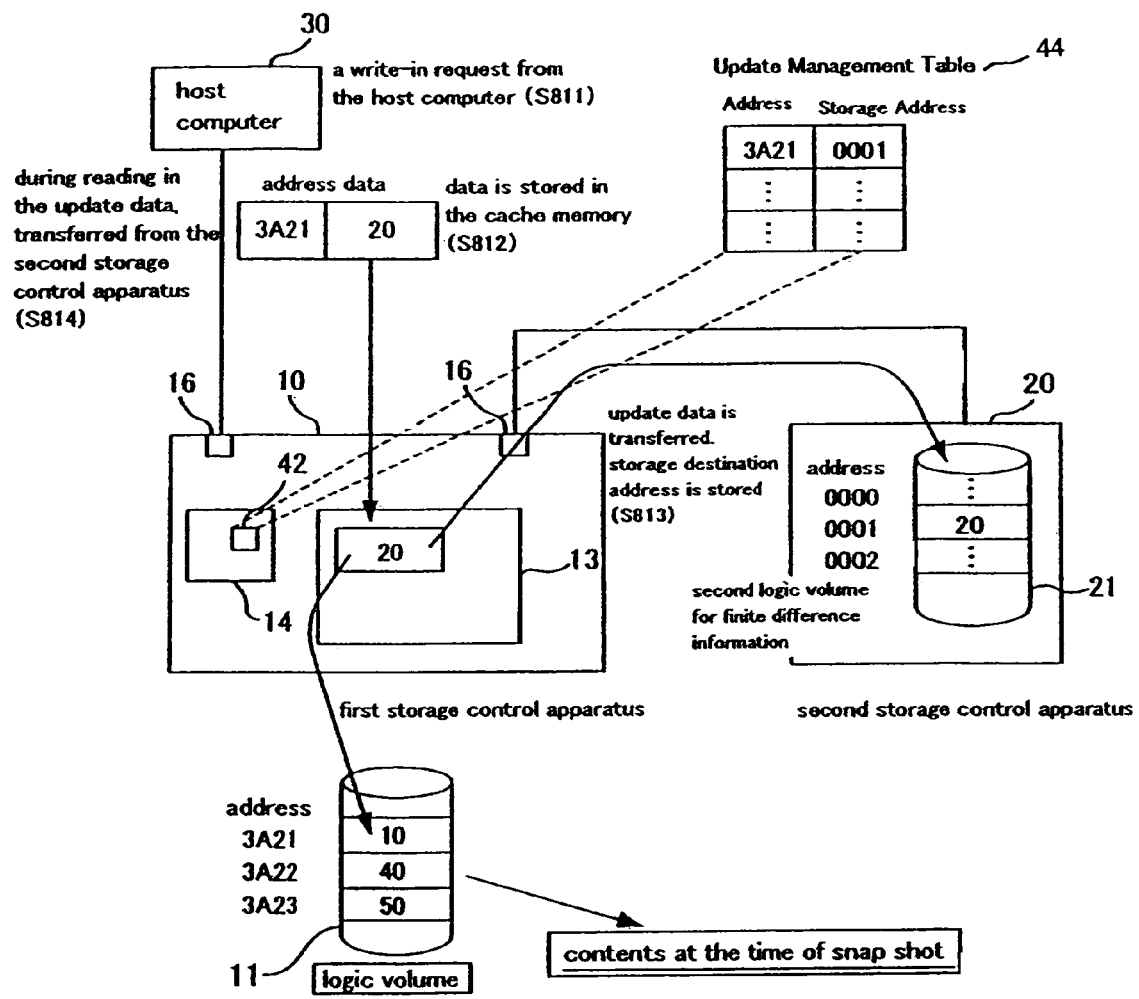
FIG. 8 illustrates a snapshot function according to one embodiment of the invention.

In the above mechanism, though the first storage control apparatus 10 stores once the new data in the cache memory 13 of the first storage control apparatus 10 itself at the timing when the first storage control apparatus 10 has received a data write-in request from the host computer 30 (for example, (S813) in FIG. 8), the new data is read out from the second storage control apparatus 20 and is transmitted to the first storage control apparatus 10 when the new data is reflected on the first logic volume 11. However, this increases the traffic on the second network 51 in vain.

Figure 10:
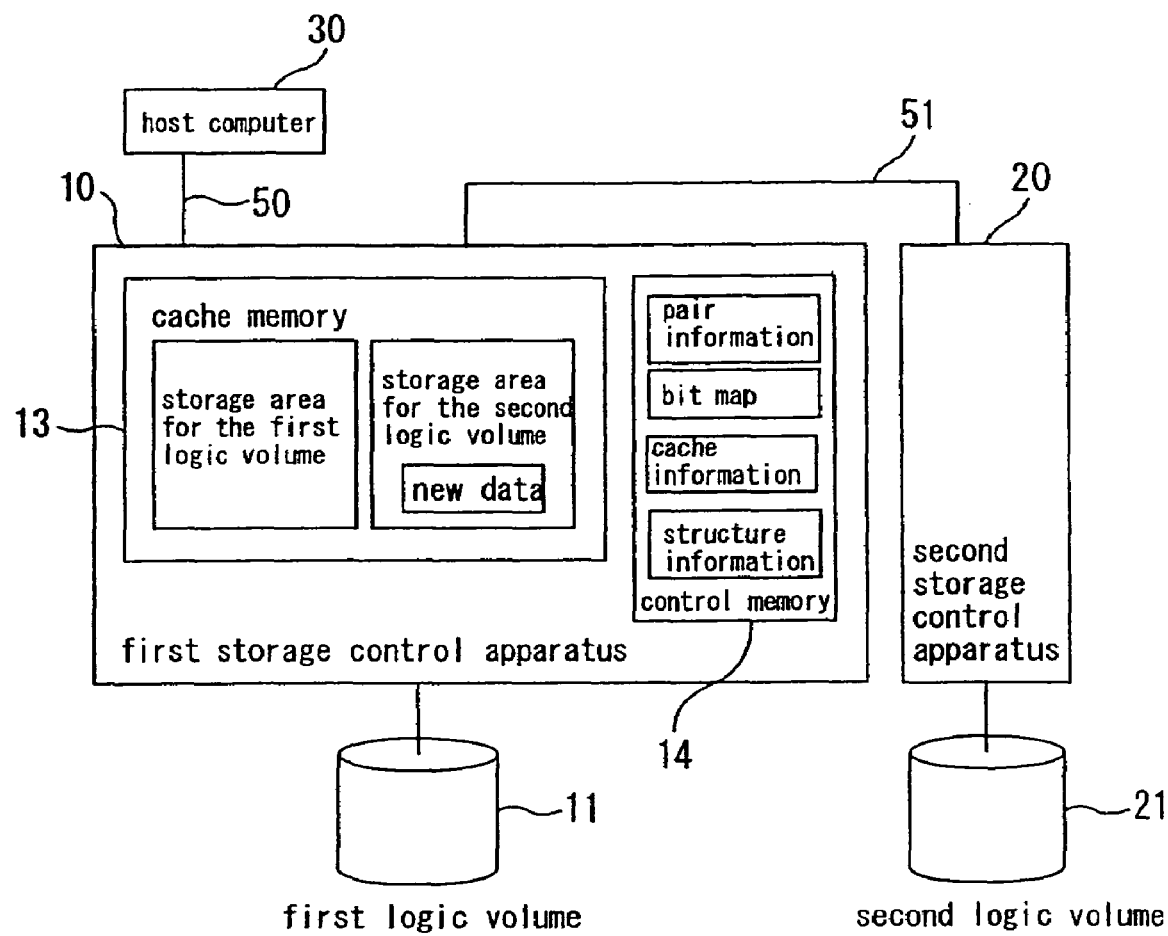
FIG. 10 illustrates a mechanism for reflecting the new data on the first logic volume, according to one embodiment of the invention.
Figure 11:
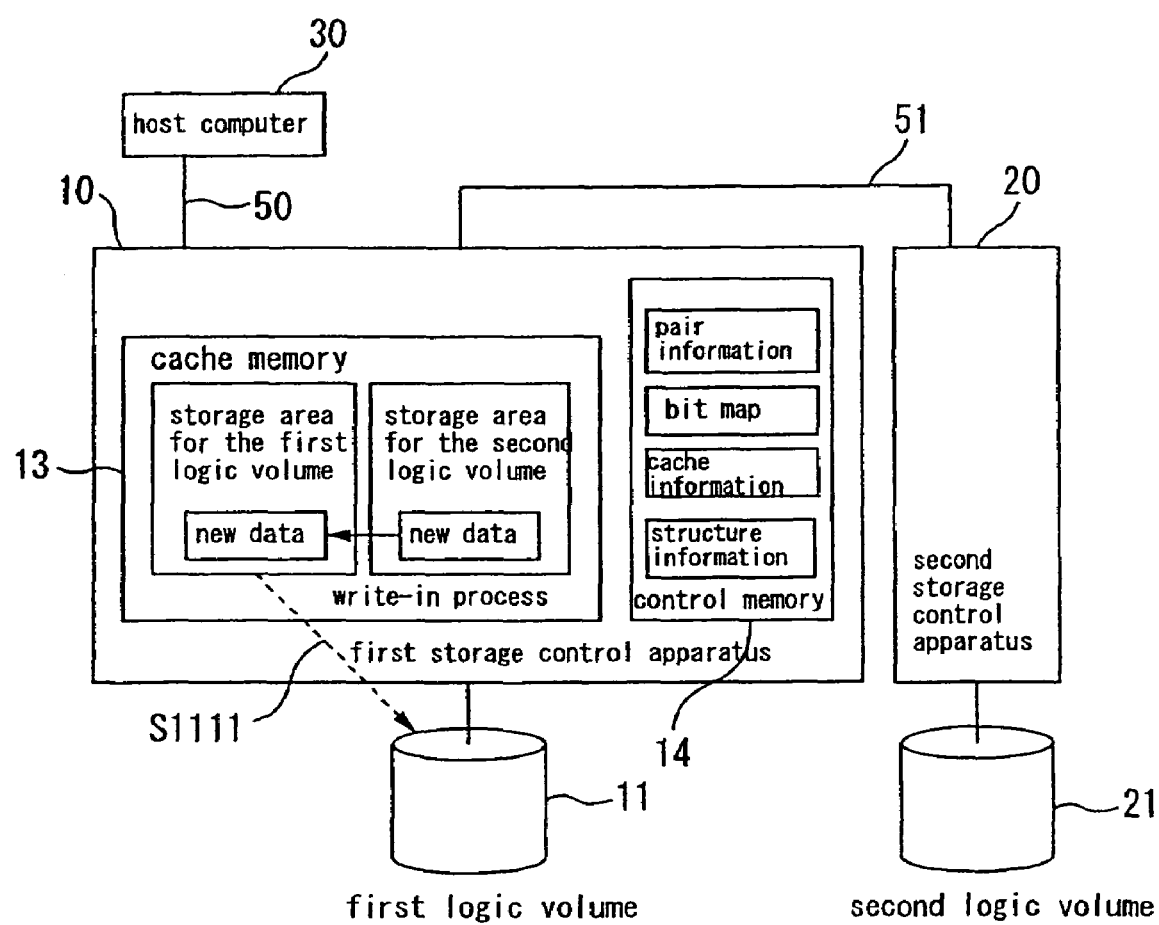
FIG. 11 illustrates a mechanism for reflecting the new data on the first logic volume, according to one embodiment of the invention.

Then, as shown in FIG. 10, it can be arranged that, for example, when the first storage control apparatus 10 has received the data write-in request, it keeps the new data temporarily stored in the cache memory 13 stored as it is and, when it tries to get the new data reflected on the first logic volume 11, as shown in FIG. 11, it writes the new data stored in the cache memory 13 to the first logic volume 11 without reading out the new data from the second logic volume 21 (S1111).

In this case, whether the new data is kept stored in the cache memory 13 or not is managed by, for example, as shown in the table 1200 in FIG. 12, ON or OFF of a flag being related to the cache address designating a storage position of the new data on the cache memory.

In this mechanism, the storage area of the cache memory 13 tends to decrease due to the new data kept stored. Therefore, it can also be arranged that, when the first storage control apparatus 10 has received a data write-in request from the host computer 30, whether the new data is kept stored in the cache memory 13 or not is determined depending on the use status such as the remaining amount of the storage area of the cache memory 13. As shown in the table 1300 in FIG. 13, the remaining amount of the cache memory 13 is grasped by managing the remaining amount of the cache memory 13. When the new data is reflected on the first logic volume 11, if, for example, the new data is stored in the cache memory 13, this new data is utilized, and if it is not, the new data is obtained from the second logic volume 21.

It can be arranged that, when the new data is reflected on the first logic volume 11, whether the new data is stored in the cache memory 13 is checked and, if it is stored, the read-out request is not transmitted and the new data stored in the cache memory 13 is stored at a storage position in the first logic volume 11 corresponding to the new data and, if it is not stored, a read-out request for the new data is transmitted to the second storage control apparatus 20 and the new data transmitted back in response to the read-out request is stored in the storage position of the first logic volume 11 corresponding to the new data. According to this method, a system in which the new data is not necessarily stored in the cache memory can be flexibly coped with since the processes are switched between the cases where the new data is stored in the cache memory and where it is not. It can also be arranged that the first storage control apparatus 10 determines whether the new data is kept stored in the cache memory 13 or not depending on the use status of the cache memory 13.

According to the above mechanism, the influence on the second network 51 caused by the reflecting of the new data on the first logic volume 11 is suppressed. Furthermore, high-speed processes can be realized since no communication is generated between the first and the second storage control apparatus 10 and 20 because the new data can be reflected on the first logic volume 11 only with the processes of the first storage control apparatus 10 itself.

<Exchange of Roles of Logic Volumes>

For example, in the above-described data copy function, an exchange of roles of the copy source and the copy destination between the first logic volume 11 and the second logic volume 21 may be desired. Similarly in the above-described snapshot function, an exchange of roles between the first logic volume 11 and the second logic volume 21 may be desired.

In these cases, it is considered that an exchange of the data stored in the first logic volume 11 and the data stored in the second logic volume 21 is carried out by, for example, transmitting those data respectively to the opposite logic volume between the first storage control apparatus 10 and the second storage control apparatus 20 through the second network 51 and their roles are exchanged thereafter. However, in this case, the communication on the second network 51 is influenced by the above transmission.

Then, the first storage control apparatus 10 of this embodiment has a mechanism for exchanging those roles at a timing when the contents of the first logic volume 11 and the contents of the second logic volume 21 becomes same such as, for example, when the contents of the logic volumes being the copy source and the copy destination are synchronized in the above-described data copy function, or when the new data is reflected on the logic volume that stored the old data in the above-described snapshot function.

That is, for example, as shown in the table 1400 in FIG. 14, in the data copy function, when the first logic volume 11 is set as the copy source and the second logic volume 21 is set as the copy destination, it is arranged that the first logic volume 11 is recognized as the copy destination and the second logic volume 21 is recognized as the copy source by the program realizing the data copy function as shown in the table 1500 in FIG. 15 at a timing when the contents of the logic volume 11 and 21 are same and their roles are exchanged with each other. Furthermore, in the snapshot function, for example, as shown in the table 1600 in FIG. 16, when the first logic volume 11 is used for storing the old data and the second logic volume 21 is used for storing the new data, it is arranged that the first logic volume 11 is recognized as the one for storing the new data and the second logic volume 21 is recognized as the one for storing the old data by the program realizing the snapshot function at a timing when the contents of the logic volumes 11 and 21 are same as shown in the table 1700 in FIG. 17. The above tables shown in FIG. 14 to FIG. 17 are stored in, for example, the control memory 14.

According to the above mechanism, the roles of the first logic volume 11 and the second logic volume 21 recognized by the program realizing the data copy function and snapshot function etc. can be exchanged without carrying out any data transmission through the second network 51. In a case where the data copy function and the snapshot function are applied in a connection structure shown in FIG. 1 as a result of introducing a first storage control apparatus 10 having a higher performance to an environment where a second storage control apparatus 20 is operated, exchanging the roles of the logic volumes 11 and 21 may be desired afterward for the reason such as that a higher performance should be applied to the copy source. However, even in this case, according to the above mechanism, the roles of the logic volumes 11 and 21 recognized by the program realizing the data copy function and the snapshot function can be exchanged without pressuring the second network 51.

<Check Code>

The first storage control apparatus 10 attaches a check code to data to be stored in the first logic volume 11 for the purpose of securing the data reliability, etc. The check code is an error correction code (ECC) such as, for example, a check sum, a parity bit, a Hamming code, cyclic redundancy check code (CRC code). The first storage control apparatus 10 creates a check code for, for example, at every predetermined length of data and attaches it to the data.

The first storage control apparatus 10 has a mechanism for checking the consistency and the validity of data by, for example, checking whether any error such as a bit garbling exists in the data or not using the check code when the first storage control apparatus 10, for example, reads data from or writes data in the first logic volume 11. The first storage control apparatus 10 also has a mechanism for correcting errors and notifying the management computer that it has detected an error. The first storage control apparatus 10 further has a mechanism for carrying out such processes concerning the check code also to the data stored in the second logic volume 21 of the second storage control apparatus 20. This mechanism will be described referring to FIG. 18.

When a data write-in request received from the host computer (S1811) is to be handled by the second storage control apparatus 20, the first storage control apparatus 10 creates a check code about a write-in data transmitted from the host computer 30 attached to the data write-in request (S1812) and transmits to the second storage control apparatus 20 a data write-in request about the write-in data, to which the created check code is attached (S1813).

Figure 18:
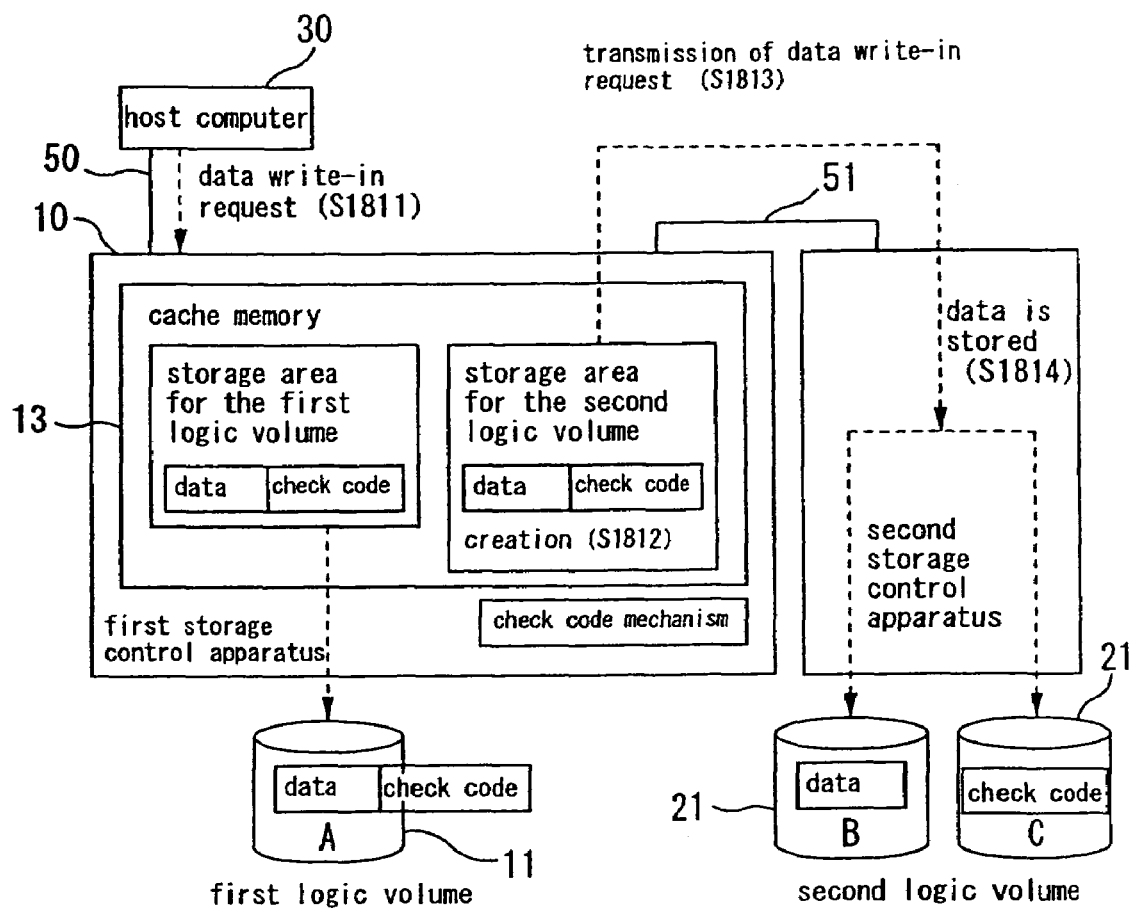
FIG. 18 illustrates a process concerning check codes, according to one embodiment of the invention.

The second storage control apparatus 20 receives the data write-in request and stores in the second logic volume 21 the write-in data to which the check code is attached (S1814). At this stage, it can also be arranged that, as shown in FIG. 18, the write-in data and its check code are stored respectively in different logic volumes of the second storage control apparatus 20, or that each of them are stored respectively in consecutive storage areas in the same logic volume. It can also be arranged that they are stored respectively in storage areas being not consecutive in the same logic volume.

In this case, it is arranged that information indicating which data the check code is about (for example, an identifier and an address of the logic volume where the corresponding data is stored) is attached to each check code. When they are stored in different logic volumes, it is arranged that, for example, data input/output requests corresponding to each of them are transmitted from the first storage control apparatus 10 to the second storage control apparatus 20.

According to the above mechanism, even when the second storage control apparatus 20 does not have the mechanism concerning check codes that the first storage control apparatus 10 has, the mechanism concerning check codes can be applied to the data to be stored in the second logic volume 21.

<Extension of Scope to Apply Commands>

The first storage control apparatus 10 has a mechanism for interpreting and executing commands which the second storage control apparatus 20 does not support (hereinafter referred to as "specific commands"). The first storage control apparatus 10 further has a mechanism for applying the specific commands also to the data stored in the second logic volume 21 of the second storage control apparatus 20. This mechanism is effective when, for example, the second storage control apparatus 20 does not support the specific commands.

When the first storage control apparatus 10 has received from a host computer a data input/output request targeting a storage device of the second storage control apparatus 20, the first storage control apparatus 10 checks whether the command described in the data input/output request is a specific command or not. Then, if the command is a specific command, the first storage control apparatus 10 creates a command, which the second storage control apparatus 20 can interpret and execute, for allowing the second storage control apparatus 20 to execute a process for responding the command and transmits to the second storage control apparatus 20 a data input/output request in which the created command is described. That is, the first storage control apparatus 10 functions in a sense as a command converting apparatus that converts the specific commands that the second storage control apparatus 20 cannot interpret and execute into commands that the second storage control apparatus 20 can interpret and execute.

Since the first storage control apparatus 10 functions as a command converting apparatus for the second storage control apparatus 20 in this manner, even when the second storage control apparatus 20 does not have any intelligent functions, the host computer can utilize the storage resources of the second storage control apparatus 20 as if the second storage control apparatus 20 has such functions (or as if the first storage control apparatus 10 is integrated with the second storage control apparatus 20).

Furthermore, the scope to apply commands that only the first storage control apparatus 10 can interpret and execute can be extended to the second storage control apparatus 20. Therefore, when, for example, the first storage control apparatus 10 is introduced to an environment where the second storage control apparatus 20 is installed, while the extension of storage resource is being progressed by a storage device of the second storage control apparatus 20 being an existing asset, the commands which only the first storage control apparatus 10 can interpret and execute can be applied when the storage resource of the second storage control apparatus 20 is utilized and, for example, in a data center etc., the second storage control apparatus 20 being an existing asset can be effectively utilized.

A structure for realizing the above mechanisms will be described in detail.

Figure 19:
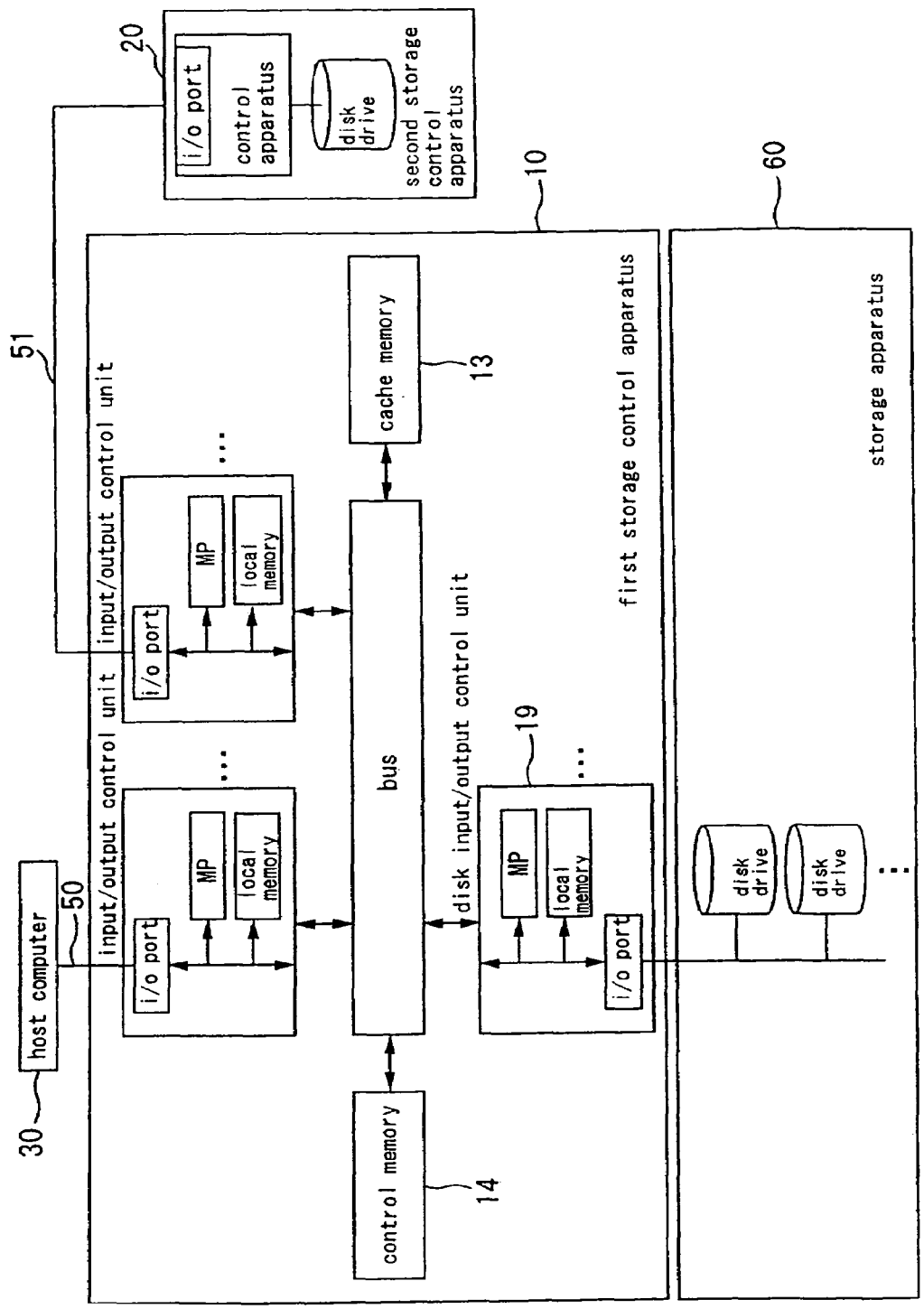
FIG. 19 shows a hardware structure of the first storage control apparatus and the second storage control apparatus, according to one embodiment of the invention.
Figure 20:
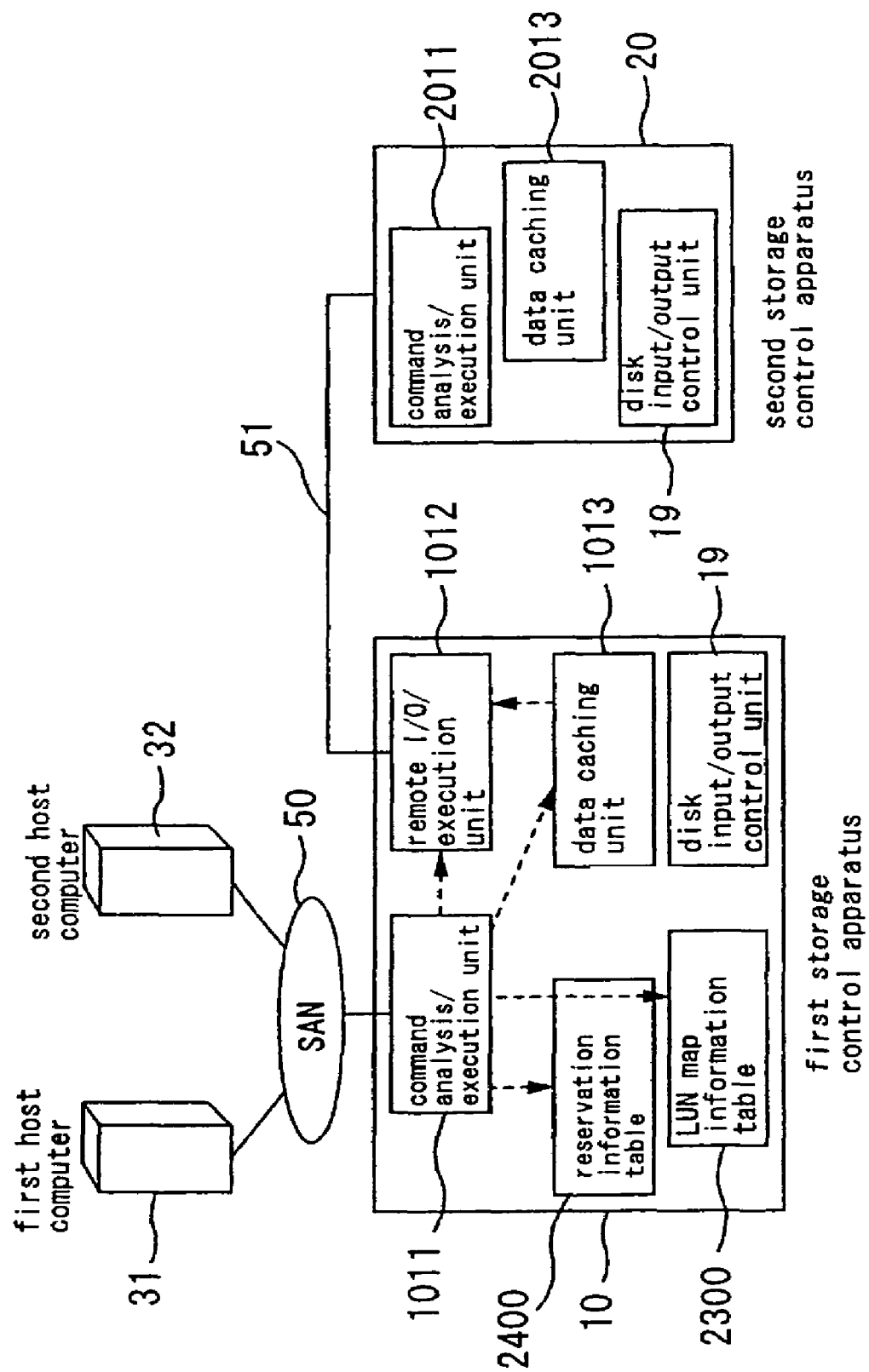
FIG. 20 shows the main functional blocks included in the first storage control apparatus and the second storage control apparatus, according to one embodiment of the invention.

FIG. 19 shows the hardware structure of the first storage control apparatus 10 and the second storage control apparatus 20 used in the following description and FIG. 20 shows the main functional blocks that the first storage control apparatus 10 and the second storage control apparatus 20 have and that are realized by the hardware shown in FIG. 19 and the software being run on that hardware. However, a storage apparatus 60 is omitted in FIG. 20.

(1) Specific Reservation Command

A case where the specific commands are specific reservation commands defined in SCSI standard will be described as an example. In addition to the conventional reservation command function conforming to the SCSI standard, for each LU, setting such as write-in enable/unable, read-out enable/unable etc. for each WWN (World Wide Name) (for example, a WWN given to the host computer 30) attached to a data input/output request can be carried out to the specific reservation commands.

Figure 21:
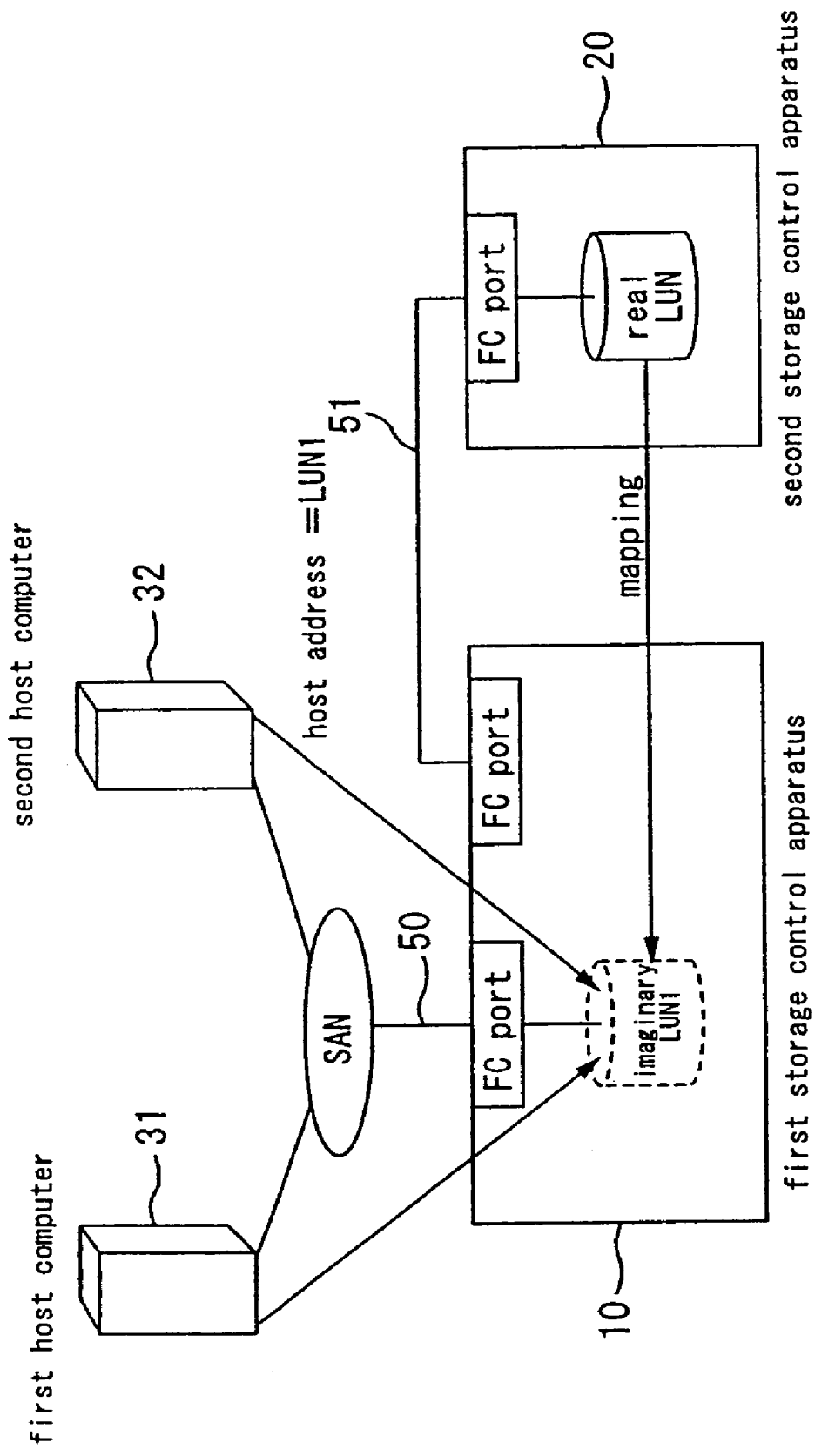
FIG. 21 illustrates a situation where an LUN of the second storage control apparatus is managed being mapped on the first storage control apparatus side, according to one embodiment of the invention.

FIG. 21 illustrates a situation where an LUN of the second storage control apparatus 20 is managed by being mapped on the first storage control apparatus 10. In this figure, the storage apparatus 60 is omitted. As to the detailed mapping method, since it is same as the one described above with FIG. 2 and its description is omitted.

Figure 22:
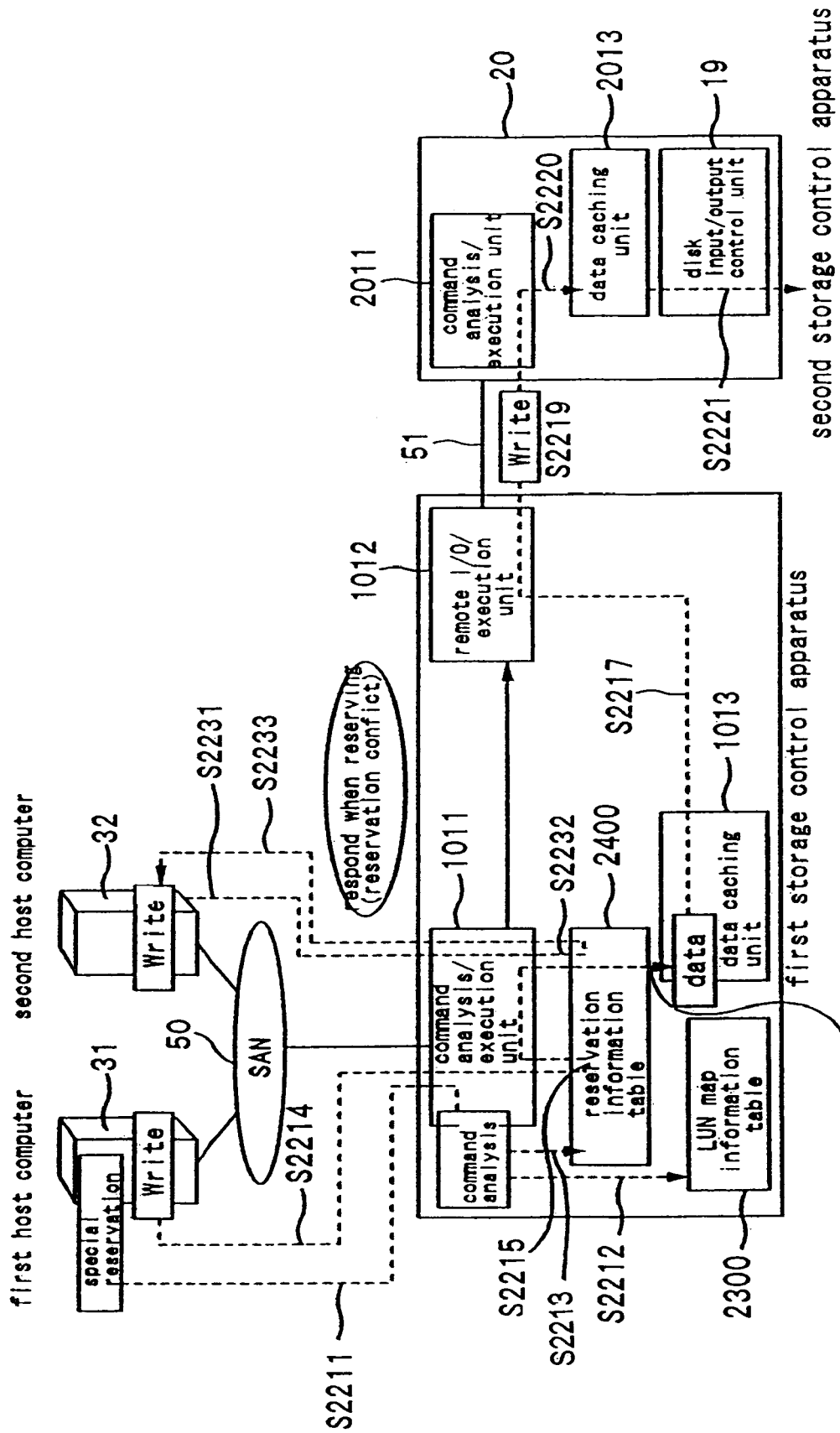
FIG. 22 illustrates an operation of the storage system when a data input/output request in which a special reservation command directed to a storage device of the second storage control apparatus is described is transmitted from the host computer to the first storage control apparatus, according to one embodiment of the invention.

FIG. 22 illustrates an operation when a data input/output request in which a specific reservation command targeting a storage device of the second storage control apparatus 20 is described is transmitted from a host computer 31 to the first storage control apparatus 10. In this figure, the storage apparatus 60 is omitted.

A specific reservation command is transmitted from the first host computer 31 to the first storage control apparatus 10 and the first storage control apparatus 10 receives the command (S2211). The specific reservation command received by the first storage control apparatus 10 is referred to the LU map information table 2300 shown in FIG. 23 by a command analysis/execution unit 1011 of the first storage control apparatus 10. Therefore, the command analysis/execution unit 1011 recognizes that an LU being set in the command targets the storage device of the second storage control apparatus 20 (S2212), sets (i.e., reservation) the reservation flag of the LU in the reservation information table 2400 shown in FIG. 24 and simultaneously registers the WWN of the host computer 31 that has transmitted the data input/output request in the reservation information table 2400 relating the WWN to its LU (S2213).

Next, a data input/output request in which a data write-in command ("Write" command) is described is transmitted from the first host computer 31 to the first storage control apparatus 10 and the first storage control apparatus 10 receives it (S2214). Then, the command analysis/execution unit 1011 checks whether the WWN described in the received data input/output request is same as the WWN registered in the reservation information table 2400 as to the LU being the target of the data input/output request (S2215). In this case, the WWNs match and the command analysis/execution unit 1011 progresses the process for the data write-in command.

Next, the command analysis/execution unit 1011 instructs the data-caching unit 1013 to store in the cache memory 13 (not shown in FIG. 22) the data of write-in target received attached to the data write-in command (S2216) and the data-caching unit 1013 stores in the cache memory 13 the data of write-in target and notifies to a remote I/O control unit 1012 that it has stored the data (S2217).

Next, the command analysis/execution unit 1011 controls the remote I/O control unit 1012 (S2216) and the remote I/O control unit 1012 transmits to the second storage control apparatus 20 the data write-in command about the write-in data stored in the cache memory 13 (S2219). At this stage, the data write-in command is a command conforming to the SCSI standard that the second storage control apparatus 20 also can analyze and execute.

The data write-in command received by the second storage control apparatus 20 is analyzed in the command analysis/execution unit 2011 of the second storage control apparatus 20 and the data caching unit 2013 stores in the cache memory (not shown) the data of write-in target received with the data write-in command (S2220). Then, the disk input/output control unit 19 stores in the storage device (not shown) the data of write-in target stored in the cache memory of the second storage control apparatus 20.

On the other hand, when a data input/output request in which a command targeting an LU during reservation is described has been transmitted from a computer other than the first host computer 31, for example, a second host computer 32 to the first storage control apparatus 10 (S2231), the command analysis/execution unit 1011 of the first storage control apparatus 10 checks whether the WWN described in the received data input/output request is same as the WWN registered in the reservation information table 2400 for the LU being the target of the data input/output request (S2232). At this stage, in this case, since the WWNs are not same, the command analysis/execution unit 2011 transmits to the second host computer 32 a message telling that the LU is in reservation (S2233).

According to the above mechanism, the scope to apply the specific reservation commands that only the first storage control apparatus 10 can interpret/execute can be extended to the second storage control apparatus 20. Therefore, when, for example, the second storage control apparatus 20 having no function for interpreting/executing the specific commands is installed and the first storage control apparatus 10 having such functions is introduced, while extension of the storage resource is being progressed by the storage device of the second storage control apparatus 20 being an existing asset, the function for the specific reservation commands can be applied when the storage resource of the second storage control apparatus 20 is utilized. Therefore, the existing assets can be effectively utilized in, for example, data centers.

(2) E-Copy Command

Next, the case where the specific commands are extended copy commands (E-copy commands) defined in SCSI will be described. The commands are used when, for example, the device itself that has issued the command does not copy the data but the copying is carried out between other devices.

Figure 25:
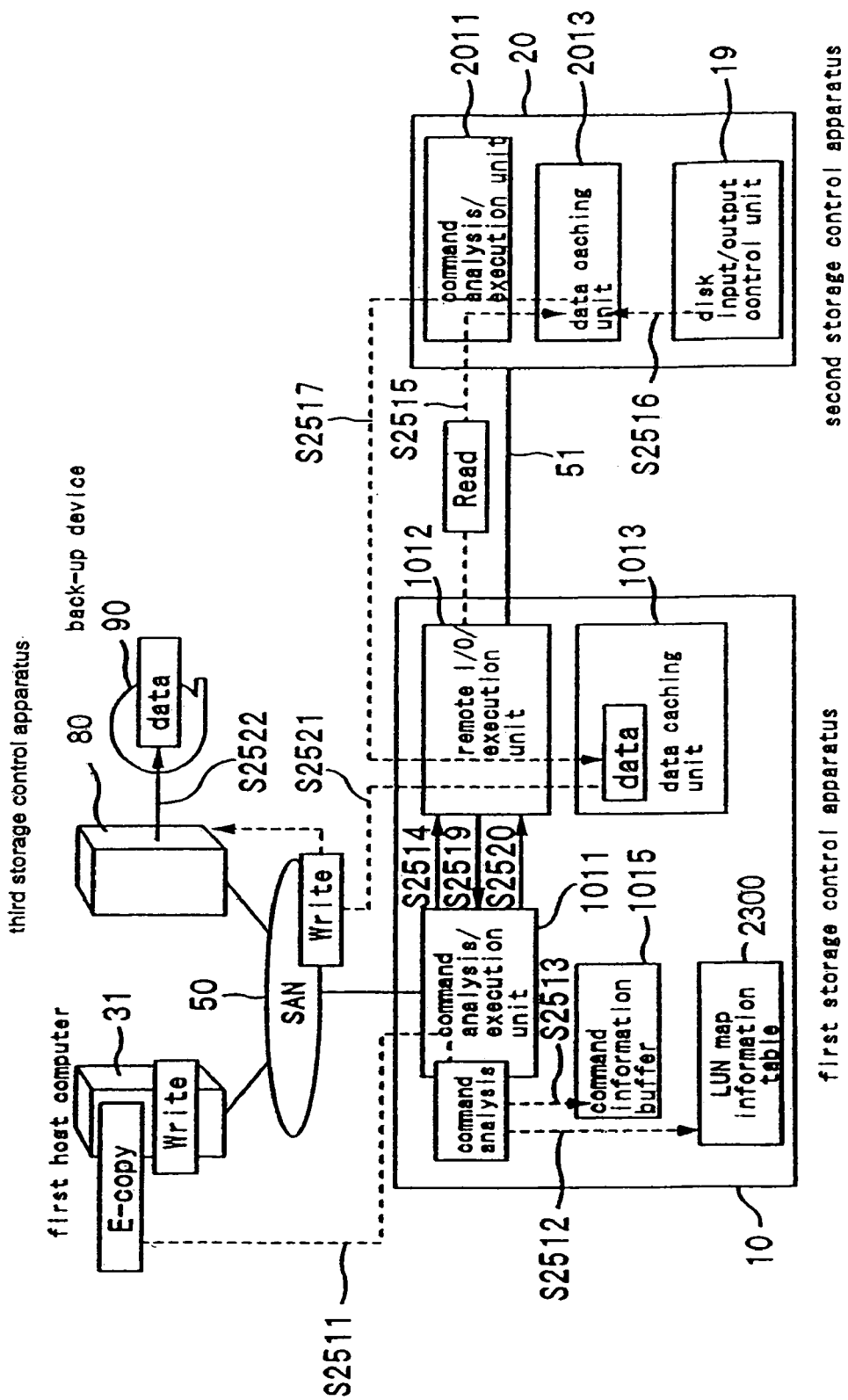
FIG. 25 illustrates an operation of the storage system according to one embodiment of the invention when an E-copy command instructing to copy data in the second logic volume of the second storage control apparatus to a back-up device connected to a third storage control apparatus is transmitted from a host computer to the first storage control apparatus.

FIG. 25 illustrates an operation of the storage system when an E-copy command is transmitted from the first host computer 31 to the first storage control apparatus 10 an E-copy command instructing to copy the data in the second logic volume 21 of the second storage control apparatus 20 to a back-up device 90 connected to a third storage control apparatus 80.

First, an E-copy command is transmitted from the first host computer 31 to the first storage control apparatus 10 and the first storage control apparatus 10 receives this command (S2511).

The E-copy command received by the first storage control apparatus 10 is referred to the LU map information table 2300 shown in FIG. 23 by the command analysis/execution unit 1011 of the first storage control apparatus 10. As a result of this, the command analysis/execution unit 1011 recognizes that the logic volume being the copy target designated in the command is targeting the second logic volume 21 of the second storage control apparatus 20 (S2512). The command analysis/execution unit 1011 also stores in a command control buffer 1015 on the control memory 14 a source address being the address of the copy source device (the second logic volume) set in the command and a destination address being the address of copy destination device (the back-up device 90) (S2513).

Next, the command analysis/execution unit 1011 instructs the remote I/O execution unit 1012 to transmit a data read-out command to the second storage control apparatus 20 organizing the second logic volume 21 designated by the source address (S2514). Then, the remote I/O execution unit 1012 having received this instruction transmits to the second storage control apparatus 20 a data read command being a command conforming to SCSI standard that can be analyzed/executed in the second storage control apparatus 20 (S2515).

When the second storage control apparatus 20 has received the data read command, the command analysis/execution unit 2011 of the second storage control apparatus 20 analyzes this command, reads out the targeted data by instructing the disk input/output control unit 19 to do so (S2516) and transmits the data to the first storage control apparatus 10 (S2517). This read-out process is executed utilizing the data in the cache memory of the second storage control apparatus 20 if the data exists there. If the data does not exist there, the disk input/output control unit 19 reads out the data from the second logic volume 21 and stores it in the cache memory and the read-out is executed utilizing the data in the cache memory.

Next, when the remote I/O execution unit 1012 of the first storage control apparatus 10 has received data transmitted from the second storage control apparatus 20, the remote I/O execution unit 1012 notifies the data caching unit 1013 accordingly (S2518). The data caching unit 1013 having received this notice stores the data in the cache memory 13 and notifies the command analysis/execution unit 1011 that it has stored the data (S2519).

Next, the command analysis/execution unit 1011 having received this notice notifies the remote I/O execution unit 1012 that it will transmit the data and a data write-in command about the data to the third storage control apparatus 80 connected to the back-up device 90 designated by a destination address (S2520). The remote I/O execution unit 1012 having received this notice transmits to the third storage control apparatus 80 the data and a data write-in command (S2521). Then, when the third storage control apparatus 80 has received the data and the data write-in command, it controls the back-up device 90 and starts writing the data in a storage medium (S2522). As the back-up device 90, there are, for example, a disk drive, a DAT tape drive, DVD-RAM, MO, CD-R, cassette tape etc.

According to the above mechanism, the scope to apply the E-copy commands that only the first storage control apparatus 10 can interpret/execute can be extended to the second storage control apparatus 20. Therefore, when, for example, the second storage control apparatus 20 having no function for interpreting the E-copy commands is installed and the first storage control apparatus 10 having that function is introduced, while extension of the storage resource is being progressed by the storage device of the second storage control apparatus 20, the function for the E-copy commands can be applied when the storage resource of the second storage control apparatus 20 is utilized. Therefore, the old storage control apparatus can be effectively utilized.

<Details of Information Collection Function>

Next, the details of the above-described information collection function will be described. This function is executed taking the opportunities such as, for example, when the first storage control apparatus 10 is introduced newly to the storage system, when the structure of another apparatus has been changed and when start-up direction has been issued by a user.

Figure 26:
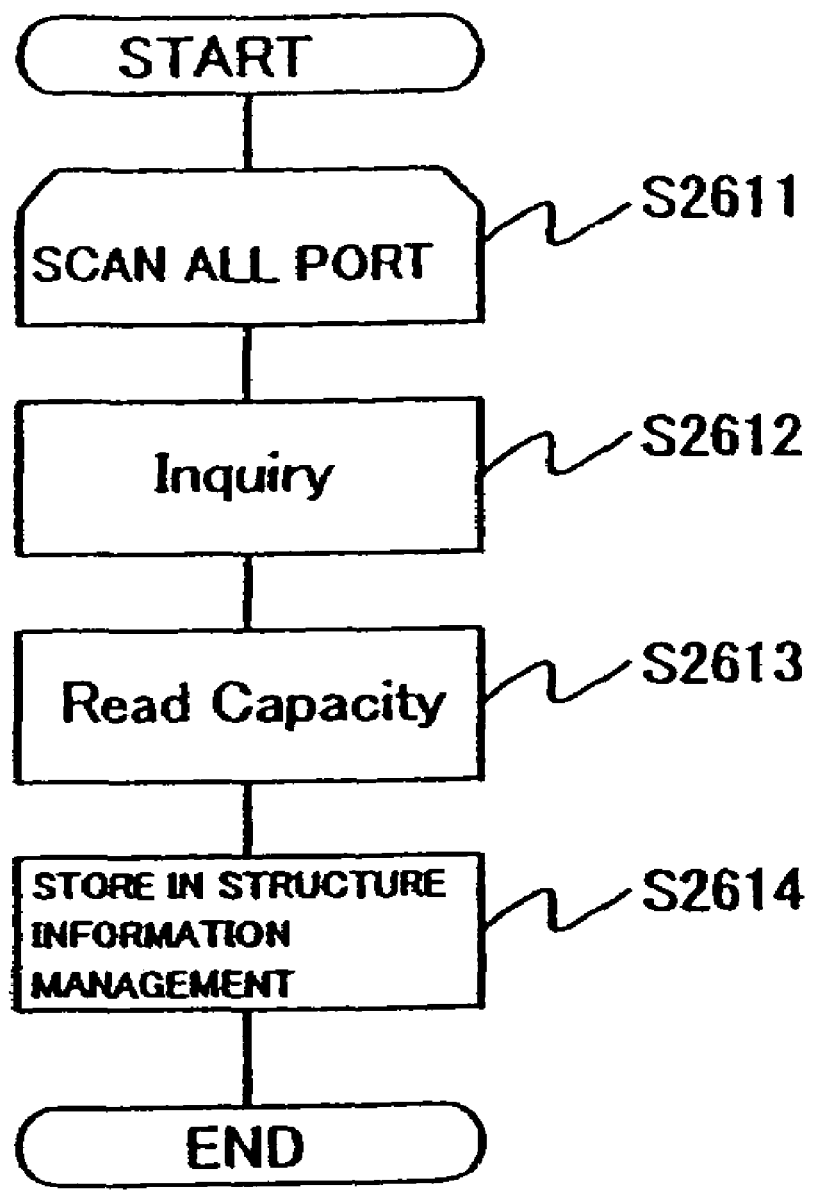
FIG. 26 shows a flow chart illustrating processes executed by the first storage control apparatus, according to one embodiment of the invention.

FIG. 26 shows a flow chart illustrating processes executed by the first storage control apparatus 10 when this function is executed. In this process, the first storage control apparatus 10, first, transmits to all the ports accessible on the second network 51, for example, a port ID and an "Inquiry" command conforming to the SCSI standard designating an LUN of a device connected to each port and, as a result of this, obtains the structure of another apparatus as a candidate for the second storage control apparatus 20 (S2611 and S2612). The first storage control apparatus 10 judges whether the apparatus can be utilized as the second storage control apparatus 20 or not based on the information obtained by the command such as the name and the type of the apparatus. For the judgment, the first storage control apparatus 10 keeps storing in the control memory 14 etc. the relation between names and types of apparatuses and determinations whether they can be used as the second storage control apparatus 20 or not.

In the above judgment, when the first storage control apparatus 10 has found an apparatus that can be used as the second storage control apparatus 20, it transmits to the apparatus a "Read Capacity" command conforming to the SCSI standard following the "Inquiry" command (S2613). Therefore, information provided by the apparatus such as storage capacity can be obtained. The first storage control apparatus 10 stores in the structure information management table 41 the information obtained in this manner (S2614).

<Route Dynamic Selection Function>

In this storage system, the first storage control apparatus 10 has a function for dynamically select the data transmission route between the first storage control apparatus 10 and the second storage control apparatus 20. This function will be described in detail in this section.

First, the mechanism for collecting information concerning the second network 51, that the first storage control apparatus 10 needs for this dynamic selection function will be described. First, the first storage control apparatus 10 obtains the information concerning the network from relay apparatuses such as, for example, Fiber Channel switches on the second network 51 and stores the information in the control memory 14. The information concerning the network is network topology information and node information in the network conforming to the Fiber Channel standard, the SCSI standard or the iSCSI standard. This information is stored in devices such as switches constituting the network.

When, for example, a plurality of network routes for reaching the second storage control apparatus 20, the first storage control apparatus 10, based on the information collected as above, selects one of the routes or selects different routes to a plurality of ports for the purpose of load distribution, and instructs the network to set the route(s). At this stage, the first storage control apparatus 10 selects dynamically the optimal network route(s) considering the congestion on the network and access status to the second storage control apparatus 20. When it has been confirmed by checking the access status of the network that the selected route(s) is/are interrupted by obstacle(s), a dynamic route control is executed in which the route(s) is/are automatically switched.

Furthermore, the first storage control apparatus 10 changes the zoning setting for the purpose of improving security etc., dynamically selects the route(s) such that the interference with other apparatuses existing on the second network 51 is suppressed and selects automatically only the route(s) being permitted to access in association with the above-described access limit function.

OTHER EMBODIMENTS

A storage system and a method for controlling the storage system according to the invention has been described based on embodiments. However, the above-described embodiments of the invention only facilitates the understanding of the invention and is not intended to limit the invention. The invention can be changed and improved without departing from the scope and the spirit of the invention and includes its equivalents.

In the above description, the first network 50 and the second network 51 can be connected to each other or each of them can be independent.

It can be structured such that a plurality of second storage control apparatus 20 exist for one first storage control apparatus 10.

In the above description, the first storage control apparatus 10 and the second storage control apparatus 20 are described as disk array apparatuses, however, they are not limited to disk array apparatuses and can be, for example, semiconductor disk apparatuses using semiconductor memories as storage devices.

The storage system can be structured such that the first and the second storage control apparatus 10 and 20 are connected through a communication line conforming to the SCSI standard.

According to the invention, it is possible to effectively utilize the old storage control apparatuses when, for example, a storage control apparatus has been newly introduced to an existing storage system.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A first storage control apparatus adapted to be coupled to a second storage control apparatus comprising second plurality of storage devices and executing data read/write processes to said second plurality of storage devices based on a Redundant Array of Independent Disks (RAID) scheme, said first storage control apparatus comprising:

a cache memory;
a first plurality of storage devices;
said first storage control apparatus receiving a first data write request, storing first data corresponding to said first data write request in said cache memory, transmitting a first completion notice of said first data write request, and executing a data write processes of said first data stored in said cache memory to said first plurality of storage devices provided with a first logical volume, having a first Logical Unit Number (LUN), of said first storage control apparatus; and
said first storage control apparatus receiving a second data write request, storing second data corresponding to said second data write request in said cache memory, transmitting a third data write request corresponding to said second data write request to said second storage control apparatus by referring to mapping information between a second LUN, designated by said second data write request, and a third LUN of a second logical volume to which said second storage control apparatus executes a data write process of said second data,
wherein said first storage control apparatus transmits a second completion notice of said second data write request without waiting for a third completion notice from said second storage control apparatus, said third completion notice corresponding to the said third data write request,
wherein when said first storage control apparatus receives a first data read request, said first storage control apparatus transmits a second data read request corresponding to said first data read request to said second storage control apparatus by referring to said mapping information.

2. A first storage control apparatus according to claim 1, wherein said first storage control apparatus transmits said second data stored in said cache memory to said second storage control apparatus.

3. A first storage control apparatus according to claim 1, wherein, after storing said second data in said cache memory, said first storage control apparatus refers to said mapping information and transmits said third data write request corresponding to said second data write request to said second storage control apparatus based on said mapping information.

4. A first storage control apparatus according to claim 1, wherein said first storage control apparatus transmits said third data write request, designating said third LUN and corresponding to said second data write request, after converting said second LUN designated by said second data write request to said third LUN.

5. A first storage control apparatus according to claim 4, wherein, after storing said second data in said cache memory, said first storage control apparatus converts said second LUN designated by said second data write request to said third LUN.

6. A first storage control apparatus adapted to be coupled to a second storage control apparatus comprising a second plurality of storage devices and executing data read/write processes to said second plurality of storage devices based on a Redundant Array of Independent Disks (RAID) scheme, said first storage control apparatus comprising:

a cache memory;
said first storage control apparatus receiving a first data write request, storing first data corresponding to said first data write request in said cache memory, transmitting a first completion notice of said first data write request, and executing data write processing of said first data stored in said cache memory to a first plurality of storage devices provided with a first logical volume, having a first Logical Unit Number (LUN), of said first storage control apparatus;
said first storage control apparatus receiving a second data write request, storing second data corresponding to said second data write request in said cache memory, transmitting a third data write request corresponding to said second data write request to said second storage control apparatus by referring to mapping information between a second LUN, designated by said second data write request, and a third LUN of a second logical volume to which said second storage control apparatus executes data write processing of said second data; and said first storage control apparatus transmitting a second completion notice of said second data write request without waiting for a third completion notice from said second storage control apparatus, said third completion notice corresponding to said third data write request, wherein when said first storage control apparatus receives a first data read request, said first storage control apparatus transmits a second data read request corresponding to said first data read request to said second storage control apparatus by referring to said mapping information.

7. A first storage control apparatus according to claim 6, wherein said first storage control apparatus transmits said second data stored in said cache memory to said second storage control apparatus.

8. A first storage control apparatus according to claim 6, wherein, after storing said second data in said cache memory, said first storage control apparatus refers to said mapping information and transmits said third data write request corresponding to said second data write request to said second storage control apparatus based on said mapping information.

9. A first storage control apparatus according to claim 6, wherein said first storage control apparatus transmits said third data write request, designating said third LUN and corresponding to said second data write request, after converting said second LUN designated by said second data write request to said third LUN.

10. A first storage control apparatus according to claim 9, wherein, after storing said second data in said cache memory, said first storage control apparatus converts said second LUN designated by said second data write request to said third LUN.

11. A control method of a first storage control apparatus adapted to be coupled to a second storage control apparatus comprising a second plurality of storage devices and executing data read/write processes to said second plurality of storage devices based on a (Redundant Array of Independent Disks (RAID) scheme, said control method comprising the steps of:

receiving a first data write request;

storing first data corresponding to said first data write request in a cache memory;

transmitting a first completion notice of said first data write request;

executing data write processing of said first data stored in said cache memory to a first plurality of storage devices provided with a first logical volume having a first Logical Unit Number (LUN) of said first storage control apparatus;

receiving a second data write request;

storing second data corresponding to said second data write request in said cache memory;

transmitting a third data write request corresponding to said second data write request to said second storage control apparatus by referring to mapping information between a second LUN, designated by said second data write request, and a third LUN of a second logical volume to which said second storage control apparatus executes data write processing; and transmitting a second completion notice of said second data write request without waiting for a third completion notice from said second storage control apparatus, the third completion notice corresponding to said third data write request, wherein when said first storage control apparatus receives a first data read request, said first storage control apparatus transmits a second data read request corresponding to said first data read request to said second storage control apparatus by referring to said mapping information.

12. A control method according to claim 11, further comprising the step of:

transmitting said second data stored in said cache memory to said second storage control apparatus.

13. A control method according to claim 11, further comprising the step of:

after storing said second data in said cache memory, referring to said mapping information.

14. A control method according to claim 11, wherein said third data write request, designating said third LUN and corresponding to said second data write request, is transmitted after converting said second LUN designated by said second data write request to said third LUN.

15. A control method according to claim 14, wherein, after storing said second data in said cache memory, said converting of said second LUN designated by said second data write request to said third LUN is processed.

16. A first storage control apparatus adapted to be coupled to a second storage control apparatus comprising a second plurality of storage devices and executing data read/write processes to said second plurality of storage devices based on a Redundant Array of Independent Disks (RAID) scheme, said first storage control apparatus comprising:

a cache memory;

said first storage control apparatus receiving a first data write request, storing first data corresponding to said first data write request in a cache memory, transmitting a second data write request corresponding to said first data write request to said second storage control apparatus by referring to mapping information between a first Logical Unit Number (LUN), designated by said first data write request, and a second LUN of a virtual volume to which said second storage control apparatus executes data write processing of said first data; and said first storage control apparatus transmitting a first completion notice of said first data write request without waiting for a second completion notice from said second storage control apparatus, said second completion notice corresponding to said second data write request, wherein when said first storage control apparatus receives a first data read request, said first storage control apparatus transmits a second data read request corresponding to said first data read request to said second storage control apparatus by referring to said mapping information.

17. A first storage control apparatus according to claim 16, wherein said first storage control apparatus transmits said first data stored in said cache memory to said second storage control apparatus.

18. A first storage control apparatus according to claim 16, wherein, after storing said first data in said cache memory, said first storage control apparatus refers to said mapping information and transmits said second data write request corresponding to said first data write request to said second storage control apparatus based on said mapping information.

19. A first storage control apparatus according to claim 16, wherein said first storage control apparatus transmits said second data write request, designating second LUN and corresponding to said first data write request, after converting said first LUN designated by said first data write request to said second LUN.

20. A first storage control apparatus according to claim 19, wherein, after storing said first data in said cache memory, said first storage control apparatus converts said first LUN designated by said first data write request to said second LUN.

* * * * *